(12) United States Patent
Tatarchuk et al.

(10) Patent No.: US 7,833,316 B2
(45) Date of Patent: Nov. 16, 2010

(54) DOPED SUPPORTED ZINC OXIDE SORBENTS FOR REGENERABLE DESULFURIZATION APPLICATIONS

(75) Inventors: Bruce Tatarchuk, Auburn, AL (US); Hongyun Yang, Auburn, AL (US); Priyanka Dhage, Auburn, AL (US)

(73) Assignee: Auburn University, Auburn, AL (US)

( * ) Notice: Subject to any disclaimer, the term of this patent is extended or adjusted under 35 U.S.C. 154(b) by 191 days.

(21) Appl. No.: 12/112,707

(22) Filed: Apr. 30, 2008

(65) Prior Publication Data

US 2008/0271602 A1 Nov. 6, 2008

Related U.S. Application Data

(60) Provisional application No. 60/927,072, filed on May 1, 2007, provisional application No. 60/927,038, filed on May 1, 2007.

(51) Int. Cl.
*B01J 20/10* (2006.01)
*B01J 20/32* (2006.01)
*B01J 20/34* (2006.01)

(52) U.S. Cl. .......................... 95/135; 96/153; 96/154; 423/594.14

(58) Field of Classification Search ................ 96/121, 96/132, 135, 153, 154; 55/523, 527; 423/244.01, 423/594.14, 622; 502/407; 208/208 R; 95/135–137

See application file for complete search history.

(56) References Cited

U.S. PATENT DOCUMENTS

| | | | |
|---|---|---|---|
| 2,261,586 A | 11/1941 | McGrath | |
| 2,768,986 A | 10/1956 | Johnson et al. | |
| 2,791,540 A | 5/1957 | Kimberlin, Jr. et al. | |
| 3,971,712 A | 7/1976 | Miller | |
| 4,188,285 A | 2/1980 | Michlmayr | |
| 4,313,820 A | 2/1982 | Farha, Jr. et al. | |
| 4,430,205 A | 2/1984 | Felsky | |
| 4,455,286 A * | 6/1984 | Young et al. | ................ 423/230 |
| 4,582,819 A | 4/1986 | Miller et al. | |
| 4,729,889 A | 3/1988 | Flytani-Stephanopoulos et al. | |
| 4,738,771 A | 4/1988 | Miller et al. | |
| 4,933,159 A | 6/1990 | Nowack et al. | |
| 5,077,261 A | 12/1991 | Schubert | |
| 5,102,745 A | 4/1992 | Tatarchuk et al. | |
| 5,130,288 A | 7/1992 | Delzer et al. | |
| 5,177,050 A | 1/1993 | Schubert | |
| 5,254,516 A | 10/1993 | Gupta et al. | |
| 5,700,439 A | 12/1997 | Goyette et al. | |
| 5,710,089 A | 1/1998 | Khare | |
| 6,150,300 A | 11/2000 | Khare et al. | |
| 6,271,173 B1 | 8/2001 | Khare | |
| 6,350,422 B1 | 2/2002 | Khare et al. | |
| 6,399,530 B1 | 6/2002 | Chen et al. | |
| 6,531,052 B1 | 3/2003 | Frye et al. | |
| 6,683,024 B1 * | 1/2004 | Khare et al. | ................ 502/400 |
| 7,148,389 B2 | 12/2006 | Yang et al. | |
| 7,341,977 B2 | 3/2008 | Klabunde et al. | |
| 7,427,581 B2 * | 9/2008 | Khare | ................ 502/406 |
| 2002/0008160 A1 | 1/2002 | Martin | |
| 2002/0041842 A1 | 4/2002 | Ruettinger et al. | |
| 2003/0032555 A1 * | 2/2003 | Dodwell | ................ 502/400 |
| 2003/0183801 A1 | 10/2003 | Yang et al. | |
| 2003/0183802 A1 | 10/2003 | Price et al. | |
| 2004/0048743 A1 | 3/2004 | Malandra et al. | |
| 2004/0140244 A1 | 7/2004 | Sughrue et al. | |
| 2004/0260139 A1 | 12/2004 | Klabunde et al. | |
| 2005/0263441 A1 | 12/2005 | Antonio et al. | |
| 2006/0081499 A1 * | 4/2006 | Khare | ................ 208/15 |
| 2006/0166809 A1 | 7/2006 | Malek et al. | |

FOREIGN PATENT DOCUMENTS

| | | |
|---|---|---|
| EP | 1 839 743 | 10/2007 |
| WO | WO 02/08160 | 1/2002 |
| WO | WO 2006/068135 | 6/2006 |

OTHER PUBLICATIONS

Yang et al, "Doped ZnO Sorbents for H2S Removal with High Capacity and Wide Temperature Characteristics," The 2006 AICHE Annual Meeting, Nov. 12, 2006, XP008096940.

Yang et al, "Doped ZnO Sorbents for H2S Temperature Characteristics," The 2006 AICHE Annual Meeting, http:// www.eng.auburn.edu/center/microfibrous/AICHE2006/AICHE2006-2.pdf, Nov. 23, 2006, XP002497975.

Chang et al, "Facile Regeneration Vitreous Microfibrous Entrapped Supported AnO Sorbent with High Contacting Efficiency for Bulk H2S Removal from Reformate Streams in Fuel Cell Applications," Journal of Materials Engineering and Performance, pp. 439-441, (2006).

Priyanka et al, "Promoted ZnO Sorbents for Low Temperature H2S Removal: Influence of Temperature, Support, Surface Area, Pore Volume and Pore Size," AICHE Spring National Meeting, http://aiche.confex.com/aiche/s08/techprogram/P114363.htm, Apr. 6, 2008, XP 002498488.

(Continued)

*Primary Examiner*—Frank M Lawrence
(74) *Attorney, Agent, or Firm*—Andrus, Sceales, Starke & Sawall, LLP

(57) ABSTRACT

Disclosed are sorbent compositions that include a silicon dioxide porous support impregnated with a mixture comprising zinc oxide and copper material. The sorbent compositions may be utilized in systems and methods for removing sulfur compounds from gaseous streams.

28 Claims, 22 Drawing Sheets

OTHER PUBLICATIONS

Yang et al, "Novel Doped Zinc Oxide Sorbents for Regenerable Desulfurization Applicatins at Ambient Conditions," 2007 AICHE Annual Meeting, http://aiche.confex.com/aiche/2007/techprogram/P97562.htm, Nov. 4, 2007, XP002498489.

Yang, "Gas Phase Desulfurization Using Regenerable Microfibrous Entrapped Metal Oxide Based Sorbents for Logistic PEM Fuel Cell Applications," http://graduate.auburn.edu/fpdb/auetd/YANG_HONGYUN_44.pdf, Aug. 4, 2007, XP002498490.

PCT Search Report, International Patent Application No. PCT/US2008/062054, European Patent Office, Oct. 6, 2008.

Barsoum, M.W., Fundamentals of Ceramics (Series in Materials Science and Engineering), p. 136-171, 1st Ed. Taylor & Francis, 2002.

Grindley, T.; Steinfeld, G. Development and Testing of Regenerable Hot Coal-Gas Desulfurization Sorbents, DOE/MC/16545-1125, 1981.

Lu Y., Athitsuksanoh, N., Yang, H.Y., Chang, B.K., Queen, A.P., Tatarchuk, B.J., Microfibrous Entrapped ZnO-Supported Sorbents for High Contacting Efficiency H2S Removal from Reformate Streams in PEMFC Application, in Edit by Wang, Y. & Holladay, J.D. (Eds), ACS Symposium Series, 2005, vol. 914. Microreactor Technology and Process Intensification, Washington DC, p. 406-422.

Atimatay, A.T.; Gasper-Galvin, L.D.; Poston, J.A. Novel Supported Sorbents for Hot Gas Desulfurization, *Environ. Sci. Technol.* 1993, 27, 1295-1303.

Babich, I.V.; Moulijn, J.A., Science and technology of novel processes for deep desulfurization of oil refinery streams: a review, *Fuel* 2003, 82, 607-631.

Baird, T.; Denny, P.J.; Hoyle, R.; McMonagle, F.; Stirling, D. Tweedy, J. Modified Zinc Oixde Absorbents for Low-Temperature Gas Desulfurization, *J. Chem. Soc.* Faraday Trans. 1992, 88, 3375-3382.

Bakker, W.J.W.,; Kapteijin, F.; Moulijin, J.A. A High Capacity Manganese-Based Sorbent for Regenerable High Temperature Desulfurization with Direct Sulfur production: Conceptual Process Application to Coal Gas Cleaning, *Chem. Eng. J.*, 2003, 96, 223-235.

Ben-Slimane, R.; Hepworth, M. T. Desulfurization of Hot Coal-Derived Fuel Gases with Manganese-Based Regenerable Sorbents. 1. Loading (Sulfidation)Test, *Energy & Fuels* 1994,8,1175-1183.

Borchert, H.; Zhang, Z. L.; Baerns, M. The effect of oxygen ion conductivity of catalyst for their performance in the oxidative coupling of methane. Preprints-American Chemical Society, Division of Petroleum Chemistry, 1992, 37, 111-16.

Cheng, W. H.; Kung, H. H., Chemical properties of anion vacancies on zinc oxide, *Surface Science*, 1981, 102, L21-L28.

Dantsig, G. A.; Grechenko, A. N.; Grigorev, V. V.; Serova, L. P.; Yagodkina, G. N., Effect of the method of copper oxide addition on chemisorption properties of zinc-containing sulfur-purification materials, *Zhurnal Prikladnoi Khimii* (Sankt-Peterburg, Russian Federation,) 1988, 61, 1240-1246.

Davidson, J.M.; Lawrie, C.H.; Sohail, K. Kinetics of the Absorption of Hydrogen Sulfide by High Purity and Doped High Surface Area Zinc Oxide, Ind. Eng. Chem. Res. 1995,34, 2981-2989.

Gangwal, S. K.; Harkins, S. M.; Stogner, J. M.; Bossart, S. J. Testing of Novel Sorbents for $H_2S$ Removal from Coal Gas, *Environ. Prog.* 1989, 8, 26-32.

Gasper-Galvin, L.D.; Atimatay, A.T.; Gupta, R.P. Zeolite-Supported Metal Oxide Sorbents for Hot Gas Desulfurization. *Ind. Eng. Chem. Res.* 1998, 37, 4157-4166.

Gupta, R.; Gangwal, S.K.; Jain, S.C. Developement of Zinc Ferrite Sorbents for Deulfurization of Hot Coal Gas in Fluid-Bed Reactor, *Energy & Fuels* 1992, 6,21-27.

Harrison D.P.; Jothimurugesan, K. Reaction between $H_2S$ and Zinc Oxide-Titanium Oxide Sorbents. 2. Single Pellet Sulfidaton Modeling, *Ind. Eng. Chem. Res.* 1990, 29, 1167-1172.

Harris, D.K., Cahela, D.R., Tatarchuk, B.T. Wet Layup and Sintering of Metal-Containing Microfibrous Composites for Chemical Processing Opportunities, *Composites*, Part A, 2001, 32 1117-1126; 1119, Figure 3B.

Hatori, M.; Sasaoka, E.; Uddin, M.A. Role of $TiO_2$ on Oxidative Regeneration of Spent High-Temperature Desulfurization Sorbent $ZnO-TO_2$, *Ind. Eng. Chem. Res.*, 2001, 40, 1884-1890.

Hernandez-Maldonado, A. J.; Yang, F. H.; Qi, G.; Yang, R.T., Desulfurization of transportation fuels by $\pi$-complexation sorbents: Cu(I)-, Ni(II)-, and Zn(II)-zeolites, *Appl. Catal. B: Environ*, 2005, 56,111-126.

Hernandez- Maldonado, A.J., Yang, R. T., Desulfurization of Commercial Jet Fuels by Adsorption via $\pi$-Complexation with Vapor Phase Ion Exchanged Cu(I)-Y Zeolites, *Ind. Eng. Chem. Res.* 2004, 43, 6142-6149.

Hernandez-Maldonado, A.J.; Yang, R.T.; Cannella, W., Desulfurization of Transportation Fuels by $\pi$ Complexation with Cu(I)-Y and Ag-Y Zeolites, *Ind. Eng. Chem. Res.* 2003, 42, 123-129.

Jothimurugesan, K.; Gangwal, S.K. Regeneration of Zinc Titanate $H_2S$ Sorbents, *Ind. Eng. Chem. Res.*, 1998, 37, 1929-1933.

Jun. H.K.; Lee, T.J.; Kim, J.C. A Study of Zn-Ti-Based $H_2S$ Removal Sorbents Promoted with Cobalts Oxides, *Ind. Eng. Chem. Res.*, 2002, 41, 3547-3556.

Ko, T.-H.; Chu, H.; Chaung, L-.K. The Sorption of Hydrogen Sulfide from Hot Syngas by Metal Oxides over Supports, *Chemosphere*, 2005, 58, 467-474.

Kyotani, T.: Kawashima, H.; Tomita, A. High_temperature Desulfurization Reaction with Cu-Containing Sorbents, *Environ. Sci. Technol.* 1989, 23, 218-223.

Lew, S.; Sarofim, A.; Flytzani-Stephanopoulos, Sulfidation of Zinc Titanate and Zinc Oxide Solids, *Ind. Eng. Chem. Res.* 1992, 31, 1890-1899.

Lew, S.; Jothimurugesan, K,; Flytzani-Stephanopoulos, M. High-Temperature $H_2S$ Removal from Fuel Gases by Regenerable Zinc Oxide-Titanium Dioxide Sorbents, *Ind. Eng. Chem. Res.* 1989, 535-541.

Li, Z.-J.; Flyzani-Stephanopoulos, M. Cu-Cr-O and Cu-Ce-O Regenerable Oxide Sorbents for Hot Gas Desulfurization, *Ind. Eng. Chem. Res.* 1997, 36, 187-196.

Mojtahedi, M., HaS Removal From Coal Gas at Elevated Temperature and Pressure in Fluidized Bed with Zinc Titanate Sorbents. 2. Sorbent Durability. *Energy & Fuels* 1995, 9, 782-787.

Nair et al., Advanced Adsorbents for Ultra Deep Desulfurization of Logistic Fuels Usin Micro-Fiber Entrapped Particles, AICHE Annual Meeting 2007 (online), 2007.

Nair et al., Selectivity and Reactivity of Ag Based Adsorbents During Desulfurization of Logistic Fuels, AICHE Annual Meeting 2007 (Online), 2007.a.

Pineda, M.; Palacios, J.M.; Alonso, L.; Garcia, E.; Moliner, R., Performance of Zinc Oxide Based Sorbents, for Hot Coal Gas Desulfurization in Multicycle Tests in a Fixed-Bed Reactor, *Fuel*, 2000, 79, 885-895.

Sasaoka, E.; Sada, N.; Manabe, A.; Uddin, M.A.; Sakata, Y. Modification of $ZnO-TiO_2$ High-Temperature Desulfurization Sorbent by $ZrO_2$ Addition, *Ind. Eng. Chem. Res.*, 1999, 38, 958-963.

Simanek, J.; Pick, P.; Havlicek, J., Hydrogen sulfide removal by zinc oxide, Sbornik Vysoke Skoly Chemicko-Technologicke v Praze D: *Technologie Paliv*, 1976, D31,437-483.

Slimane, R.B.; Abbasian, J. Regenerable Mixed Metal Oxide Sorbents for Coal Gas Desulfurization at Moderate Temperature, *Adv. Environ. Res.* 2000, 147-162.

Tamhankar, S.S.; Bagajewicz, M.; Gavalas, G.R.; Sharma, P.K.; Flytzani-Stephanophoulos, M. Mixed-Oxide Sorbents for High-Temperature Removal of Hydrogen Sulfide, *Ind. Eng. Chem. Process. Des. Dev.*, 1986, 25, 429-437.

Wang, Z.-M.; Lin, Y.-S. Sol-Gel Derived Alumina-Supported Copper Oxide Sorbent for Flue Gas Desulfurization, *Ind. Eng. Chem. Res.* 1998, 37, 4675-4681.

Woods, M.C.; Gangwal, S.K.; Jothimurugesan, K.; Harrison, D.P. Reaction between $H_2S$ and Zinc Oxide-Titanium Oxide Sorbents. 1. Single-Pellet Kinetic Studies, *Ind. Eng. Chem. Res.* 1990, 29, 1160-1167.

Woods, M.C.; Gangwal, S.K.; Harrison, D.P.; Jothimurugesan, K. Kinetics of the Reactions of a Zinc Ferrite Sorbents in High-Temperature Coal Gas Desulfurization, *Ind. Eng. Chem. Res.* 1991, 30, 100-107.

Xue, M.; Chitrakar, R.; Sakane, K.; Ooi, K., Screening of adsorbents for removal of $H_2S$ at room temperature, *Green Chem.* 2003, 5, 529-534.

Zhang, J.-C.; Wang, Y.-H.; Ma, R.-Y.; Wu, D.-Y. A study on Regeneration of Mn-Fe-Zn-O Supported upon $Al_2O_3$ Sorbents for Hot Gas Desulfurization, *Fuel Proc. Technol.* 2003, 84, 217-227.

cited by examiner

DOPED SUPPORTED ZINC OXIDE SORBENTS FOR REGENERABLE DESULFURIZATION APPLICATIONS

CROSS REFERENCE TO RELATED APPLICATION

This application claims the benefit of priority under 35 U.S.C. §119(e) to U.S. provisional application nos. 60/927,072, filed on May 1, 2007; and 60/927,038, filed on May 1, 2007; the contents of which are incorporated by reference herein in their entireties.

STATEMENT REGARDING FEDERALLY SPONSORED RESEARCH OR DEVELOPMENT

This invention was made with U.S. Government Support from the following agency: U.S. Army, Grant No. ARMY-W56HZV-05-C0686. The U.S. Government has certain rights in the invention.

BACKGROUND

The field of the invention relates to sorbents that may be utilized in desulfurization processes. In particular, the field of the invention relates to porous support material that is impregnated with a desulfurization agent that includes zinc oxide and a dopant.

The removal of sulfur compounds from gas and liquid streams is an important part of industrial processes including those utilized in petroleum refining operations. Sulfur is both an environmental hazard when it is a contaminant in fuel for combustion and a poison for several catalytic materials when it is present in electrochemical systems such as fuel cells. Supported metal catalysts are widely used to produce high purity hydrogen in fuel processing systems via such processes as: catalytic reformation, water gas shift (WGS), and preferential oxidation of carbon monoxide (PROX). Supported metal catalysts also are used as electrode materials in fuel cells. The metals in supported metal catalysts generally have a low sulfur tolerance (i.e. 0.1 ppmv sulfur for proton exchange membrane fuel cells (PEMFC) and ~10 ppmv for solid oxide fuel cells (SOFC)). Unfortunately, typical sulfur concentrations in fuels may be as high as 3000 ppmw.

Metal oxide based sorbents, such as zinc oxide (ZnO) have been developed to remove sulfur compounds, mainly $H_2S$, from gaseous fuels and reformates. Zinc oxide is widely used to remove $H_2S$ from gas streams at low temperatures (<500° C.) because of its high equilibrium constant and high sulfur capacity. However, zinc oxide cannot remove $H_2S$ below 0.6 ppmv at 400° C. in the presence of 30 vol % water due to equilibrium limitations. Additional desulfurization units may be required which operate at lower temperatures (room temperature to 100° C.) to remove sulfur down to 0.1 ppmv in order to meet polymer electrolyte membrane (PEM) fuel cell requirements. Moreover, during cold startup of a fuel cell system, the fuel processing units experience a temperature change from room temperature to several hundred Celsius. Therefore, a protective sorbent bed may be necessary to remove $H_2S$ residuals from the primary desulfurization unit before the unit reaches steady state. Because the reaction between $H_2S$ and a metal oxide sorbent at fuel cell stack temperatures are confined only on the outer layer of solid sorbent particles, the sulfur removal capacity at lower temperatures is limited by solid state diffusion and is much lower than that achieved at higher temperatures. The desulfurization performance and capacity of metal oxide based sorbents at low temperatures must be enhanced in order to improve and protect fuel cells against permanent deactivation.

In order to improve desulfurization performance, sorbents with high porosity and small grain sizes are preferred. In this regard, metal oxide sorbents on inert supports are widely used. In supported sorbents, active sorbent substances are supported on secondary oxides to form high surface area and high porosity sorbent particles/extrudates. These secondary compounds (supports), such as silica, mesoporous crystalline material (MCM) silica, titania, and alumina, are mainly inert to sulfur. Supports also may be utilized to enhance the structural stability for the active sorbent and to adhere/hold the sorbent crystallites within the micropores of the support in the absence of grain size and agglomeration and sintering. Supports also serve to stabilize the active metal oxide component against chemical reduction and vaporization. The supported sorbent design also facilitates the incorporation of the sorbent into process system hardware, such as monoliths. Due to the above noted advantages provided by supported sorbents, these systems provide stable performance with extended service lives.

In addition to being combined with inert supports, the active sorbents (e.g., ZnO) can also be mixed with other active metal oxides, which may function as promoter agents for the active sorbent. In particular, copper has been suggested for use in high temperature desulfurization sorbents, where CuO has an extremely high equilibrium sulfidation constant and thus may yield extremely low equilibrium $H_2S$ concentrations even at high steam contents and at high temperatures. However, the use of copper in ZnO based sorbent also has drawbacks including oxide reduction, $H_2S$ oxidation, and loss in porosity. Some of these limitations might be solved by preparing a well-designed, supported sorbent composition.

Supported CuO—ZnO sorbents have been developed using hydrated $Al_2O_3$ as a support. (See U.S. published patent application nos. 2007/0131589 and 2007/0034552). Metal hydroxides also are used for preparing sorbents. (See, e.g., U.S. Pat. No. 6,743,405). However, because these sorbents use hydrated $Al_2O_3$ and metal hydroxides, they can be utilized only in low temperature applications (below about 200° C.) and these sorbents cannot be regenerated using relatively high temperatures and stripping air.

Clearly, better sorbent compositions, systems, and methods for removing sulfur compounds are desirable.

SUMMARY

Disclosed are sorbent compositions that comprise a porous support impregnated with a sorbent mixture. The sorbent composition typically comprises a porous support impregnated with a sorbent mixture comprising zinc oxide and a Group IB transition metal material (e.g., copper material or silver material). The support may comprise porous particles. In some embodiments, the sorbent compositions comprise porous silicon dioxide particles impregnated with the sorbent mixture.

The sorbent mixture may comprise zinc oxide and copper material, for example, where the mixture comprises about 20-99% zinc oxide (w/w) and about 1-80% copper material. Preferably, the sorbent mixture comprises about 80-99% zinc oxide (w/w) and about 1-20% copper material (w/w) (e.g., about 90-99% zinc oxide (w/w) and about 1-10% copper material (w/w); about 95-99% zinc oxide (w/w) and about 1-5% copper material (w/w); about 80-90% zinc oxide (w/w) and about 10-20% copper material (w/w); or about 80-95% zinc oxide (w/w) and about 5-20% copper material (w/w)). In some embodiments of the sorbent composition, the impregnated support may comprise about 5-40% of the sorbent mixture (w/w) (and preferably about 5-30% of the sorbent mixture (w/w)).

The sorbent composition may include zinc oxide doped with copper material. Copper material may be selected from a group consisting of copper metal, copper oxide, copper nitrate, copper acetate, or combinations thereof Preferably, the copper material includes copper metal, copper oxide, or a mixture thereof.

The support may be in the form of porous particles, powder, grains, pellets, extrudates, or combinations thereof. Preferably, the support comprises porous silicon dioxide particles having a pore diameter of about 0.1-70 nm (preferably about 1-20 nm) and a pore volume of about 0.1-3.0 cc/g. Preferably, the support has a relatively high surface area (e.g., greater than about 100 $m^2/g$ or within the range of about 100-1000 $m^2/g$). The support may be relatively small in size. Preferably, the support comprises particles having an average diameter of about 30-6000 microns (or preferably about 30-3000 microns, about 30-300 microns, or about 50-100 microns).

Also disclosed are filters, filter material, filter media, and filtering systems that comprise the presently disclosed sorbent compositions. As disclosed herein, a filter material may comprise the presently disclosed sorbent compositions entrapped in a matrix of fibers. A filter material may comprise the presently disclosed sorbent compositions bonded to a matrix of fibers (e.g., via a sintering process). Preferably, the fibers are ceramic fibers, cellulose fibers, polymer fibers, or metal fibers. The fibers may be microfibers or nanofibers. Preferably, the fibers have an average diameter of about 2-20 microns and the entrapped or bonded composition comprises particles having an average diameter of about 30-300 microns. As disclosed herein, microfibrous entrapped sorbent compositions may be utilized as a polishing filter.

Also disclosed are methods for preparing the disclosed sorbent compositions. The methods may include: (a) impregnating porous particles (e.g., silicon dioxide particles) with a solution comprising a dissolved zinc precursor and a dissolved copper precursor, optionally where the volume of the solution is no more than the pore volume of the porous particles; and (b) drying and calcining the impregnated particles. In the methods of preparation, preferably the zinc precursor is a zinc species that decomposes to zinc metal, zinc oxide, or a mixture thereof, after drying and calcining. Preferably, the copper precursor is a copper species that decomposes to copper metal, copper oxide, or a mixture thereof, after drying and calcining. In the methods of preparation, preferably the solution comprising a dissolved zinc precursor is a zinc salt solution (e.g., zinc nitrate, zinc acetate, and the like), and the solution comprising a dissolved copper precursor is a copper salt solution (e.g., copper nitrate, copper acetate, and the like). Preferably, the step of impregnating is performed by incipient wetness impregnating, spray impregnating, or a combination of both. After calcining, the sorbent composition preferably comprises zinc, copper, and/or oxides thereof.

In the methods of preparation, preferably the step of drying is performed by a step selected from a group consisting of: drying at a temperature range of about (22-250° C.) (preferably about 50-200° C.); drying in sub-atmospheric pressures of about 0.001-759 torr; and drying in the presence of flowing gas stream; and a combination thereof. Preferably, the flowing gas stream comprises a gas selected from a group consisting of air, nitrogen, oxygen, argon, helium, and a combination thereof. The methods of preparation may include drying the particles at a temperature of less than about 100° C. (e.g., for at least about 1 hour) and then subsequently heating the dried particles to a temperature of about 100-200° C. for at least about 0.5 hours.

In the methods of preparation, the step of calcining typically is performed by heating the dried particles to a temperature within a range of about 100-800° C. (preferably about 300-600° C.) for at least about 0.5 hours and contacting the dried particles with an oxidizing agent. Preferably, the oxidizing agent is a gas stream comprising a gas selected from a group consisting of air, nitrogen, oxygen, argon, helium, and a combination thereof.

Also disclosed are processes for removing sulfur compounds from a stream, which may include a gaseous stream such as a gaseous hydrocarbon stream (e.g., a gaseous hydrocarbon fuel). Preferably, the process includes passing the stream through an effective amount of the disclosed sorbent composition for removing sulfur compounds from the stream. The stream may be passed through the sorbent composition for a sufficient period of time to reduce sulfur compounds in the stream to a suitable level (e.g., no more than 200 ppmv, 100 ppmw, 50 ppmv, 10 ppmv, 1 ppmv, 0.1 ppmv or less).

The process may utilize a container, cartridge, tube, or packed bed that encloses the sorbent composition (or that encloses a filter material that comprises the sorbent composition). In the process, the stream may be passed in a direction following gravitational force (i.e., downward through the sorbent composition). In other embodiments, the stream may be passed in a direction against gravitation force (i.e., upward through the sorbent composition). The process may utilize a cartridge or container that encloses the sorbent composition, where the cartridge has a bottom and a top and the stream passes into the top of the cartridge and exits the bottom of the cartridge. The process may utilize (e.g., in succession) a packed bed comprising the sorbent composition and a polishing filter.

The process may include removing sulfur compounds adsorbed to or retained by the sorbent composition, thereby regenerating the sorbent composition. Preferably, the step of removing sulfur compounds adsorbed to or retained by the sorbent composition is performed by heating the sorbent composition to a temperature between about 100-900° C. (preferably about 300-600° C.) and passing a gas stream comprising an oxidizing agent over the sorbent composition, (e.g., where the oxidizing agent is selected from a group consisting of air, pure oxygen, ozone, hydrogen peroxide, steam, and a combination thereof). Where the process utilizes a cartridge or container, the step of removing sulfur compounds adsorbed to or retained by the sorbent composition may be performed by passing air over the sorbent composition in a direction from the bottom of the cartridge to the top of the cartridge (i.e., in a direction opposite to the flow of the stream through the sorbent composition). The regenerated sorbent composition may have a sulfur capacity that is not substantially reduced in comparison to a sorbent composition prior to use (e.g., where the regenerated sorbent composition has a sulfur capacity that is at least about 80% of the sulfur capacity for the sorbent composition prior to use, and preferably at least about 85%, 90%, or 95% of the sulfur capacity for the sorbent composition prior to use).

DETAILED DESCRIPTION

Figure 1:
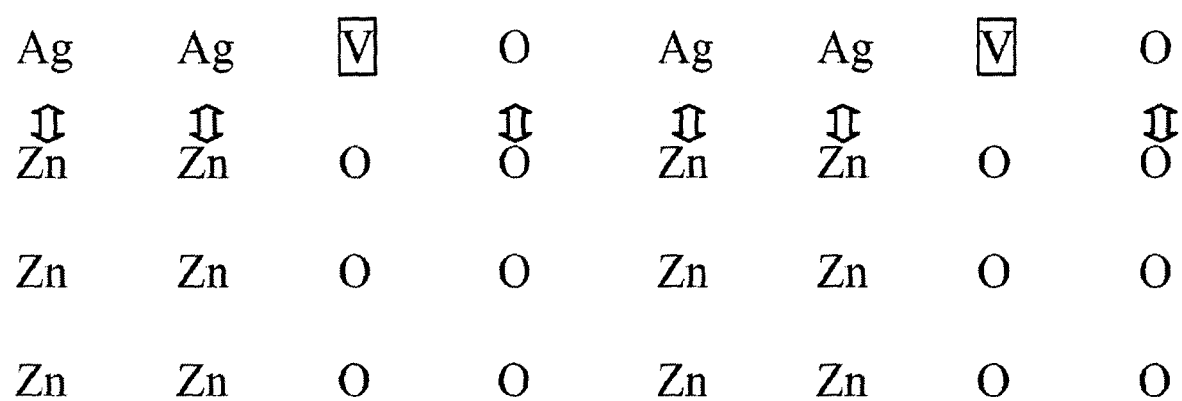
FIG. 1 provides a schematic representation in which a Group IB transition metal oxide (in this case $Ag_2O$) in ZnO creates oxygen vacancies on the anion sub-lattice. The symbol "$V$" represents the oxygen vacancy.

The present invention is described herein using several definitions, as set forth below and throughout the application.

Definitions

Unless otherwise specified, the terms "a," "an," and "the" mean "one or more."

As used herein, "about," "approximately," "substantially," and "significantly" will be understood by persons of ordinary skill in the art and will vary to some extent on the context in which they are used. If there are uses of the term which are not clear to persons of ordinary skill in the art given the context in which it is used, "about" or "approximately" will mean up to plus or minus 10% of the particular term and "substantially" and "significantly" will mean more than plus or minus 10% of the particular term.

The disclosed sorbent compositions comprise zinc oxide doped with a Group IB transition metal material. The zinc oxide in the sorbent compositions may be prepared in situ by impregnated a support with a zinc precursor (e.g., a zinc salt such as zinc nitrate or zinc acetate) and calcining the sorbent compositions (e.g., heating at high temperature for a sufficient period of time, thereby decomposing the zinc precursor).

The Group IB transition metal material may include "copper material." As disclosed herein, "copper material" may include copper metal, copper oxides, and copper salts (e.g., copper nitrate and copper acetate). After the disclosed sorbent compositions have been calcined, preferably the compositions comprise copper oxide or copper metal. Copper oxide in the sorbent compositions may be prepared in situ by impregnated a support with a copper precursor (e.g., a copper salt such as copper nitrate or copper acetate) and calcining the sorbent compositions (e.g., heating at high temperature for a sufficient period of time, thereby decomposing the copper precursor).

The disclosed supports may include silicon dioxide (e.g., MCM silicon dioxide). As used herein, "silicon dioxide" refers to "silica" having the formula $SiO_2$. Silicon dioxide may form a porous support, such as porous particles, which may be impregnated with sorbent material as disclosed herein.

As used herein, "impregnation" refers to the introduction of a solution to a porous support material. In contrast to the term "coating," the term "impregnating" means that the solution has permeated the support material or that the support material has become infused with the solution. "Coating," in contrast, only indicates that a layer of the solution has been deposited on the outer surface of a support material.

As used herein, the term "incipient wetness technique" or "IWT" refers to a technique for the synthesis of heterogeneous catalysts. Typically in IWT, an active metal precursor is dissolved in an aqueous or organic solution. Then, the metal solution is added to a catalyst support, where the volume of solution added is no greater than the pore volume of the support. Capillary action draws the solution into the pores. The catalyst can then be dried and calcined to drive off the volatile components within the solution, depositing the metal on the catalyst surface.

The sorbent compositions disclosed herein may include "promoter agents." In many industrial catalyst systems, the presence of so-called catalyst promoters is essential to achieve the required activity or selectivity. A promoter may be defined as a substance that causes a more than proportional increase in activity or selectivity when added to the catalyst. The promoter alone may be completely inactive in the catalytic process, where it is used to boost productivity. A promoter may be a structural promoter or an electronic promoter. Structural promoters cause an increase in the number of active sites. Electronic promoters produce active sites with a higher intrinsic activity. Promoter agents may include metals, metal oxides, or metal oxide precursors, for example, where the metal is selected from, but is not limited to, copper, titanium, cobalt, nickel, iron, manganese, molybdenum, zinc, tungsten, tin, vanadium, or mixtures thereof.

The disclosed sorbent compositions typically comprise "dopants." As used herein, a dopant (in catalysis and adsorption) is an impurity added to a crystal structure (e.g., a metal oxide of copper, cobalt, nickel, iron, manganese, molybdenum, zinc, tungsten, tin, and vanadium) in order to alter the surface morphology of the resulting composition.

As used herein, "morphology" relates to the structure of the adsorbent surface exposed to the stream to be desulfurized. The morphology is influenced by factors that include the crystal structure of the sorbent material, the nature of its dispersion on the support surface, and the number of exposed sorbent atoms. The same is applicable to the support surface The disclosed sorbent compositions may be utilized to remove sulfur compounds (i.e., "desulfurize") from streams such as gaseous streams or liquid streams. Gaseous streams may include gaseous hydrocarbon streams (e.g., gaseous fuel streams).

As used herein, "sulfur compounds" may include sulfur, hydrogen sulfide ($H_2S$), carbonyl sulfide (COS) and other organosulfur compounds such as mercaptans or those thiophenic compounds found in cracked gasolines, which include among others thiophene, benzothiophene, alkyl thiophenes, alkyl benzothiophenes and alkyldibenzothiophenes.

As used herein, "sulfur capacity" refers to the amount of total sulfur removed by the absorbent. Sulfur capacity may be defined in at least two ways: (1) "breakthrough capacity," which refers to the amount of sulfur removed when the sulfur concentration at the bed outlet just exceeds the required concentration; and (2) "saturation capacity," which refers to the amount of sulfur removed when the bed has been exhausted and cannot capture any more sulfur. Sulfur capacity may be expressed per gram of adsorbent used as a method to normalize comparisons. One method of expressing sulfur capacity is to cite as milligrams of sulfur captured per gram of adsorbent used (e.g., milligrams sulfur per gram adsorbent or "mg/g"). Preferably, the sorbent compositions disclosed herein have a relatively high sulfur capacity (e.g., at least about 20 mg S/g sorbent, or more preferably at least about 40, 60, 80, or 100 mg S/g sorbent).

As used herein, "breakthrough" refers to the concentration of sulfur compounds in the stream exiting an adsorbent bed observed with the passage of time.

As used herein, "saturation" is the exhaustion point of an adsorption bed beyond which no further sulfur will be removed.

As used herein, "cycle" refers to a single round of adsorption (desulfurization) and regeneration of an adsorbent bed.

As used herein, "regenerability" relates to the ability of the same adsorbent to be used for multiple cycles of adsorption after stripping the adsorbed species (e.g., by air) and then to be used for subsequent cycles of adsorption. In some embodiments, the disclosed sorbent compositions do not exhibit substantially reduced sulfur capacity after regeneration in comparison to a sorbent composition that has not been previous used and regenerated (e.g., where the regenerated sorbent composition has a sulfur capacity that is at least about 80% of that of the sorbent composition that has not been previous used and regenerated, or preferably at least about 85%, 90%, or 95% of the sorbent composition that has not been previous used and regenerated).

Compositions

The presently disclosed sorbent compositions comprise a porous support (such as porous silicon dioxide particles) impregnated with a sorbent mixture (such as zinc oxide doped with copper). The sorbent compositions exhibit unexpected, desirable characterists over sorbent compositions in the prior art. For example, the disclosed sorbent compositions have a high sulfur removal capacity and are prepared easily. Furthermore, the disclosed sorbent composition may be easily regenerated for multiple operation cycles without losing substantial sulfur capacity.

The sorbent mixture may comprise zinc oxide and copper material, for example, where the mixture comprises about 20-99% zinc oxide (w/w) and about 1-80% copper material. Preferably, the sorbent mixture comprises about 80-99% zinc oxide (w/w) and about 1-20% copper material (w/w) (e.g., about 90-99% zinc oxide (w/w) and about 1-10% copper material (w/w); about 95-99% zinc oxide (w/w) and about 1-5% copper material (w/w); about 80-90% zinc oxide (w/w) and about 10-20% copper material (w/w); or about 80-95% zinc oxide (w/w) and about 5-20% copper material (w/w)). In some embodiments, the ratio of zinc oxide to copper material in the sorbent composition (and in the sorbent mixture) may be about (4-9):1, (4-19):1, (4-99):1, (9-99):1, or (19-99):1.

The porous support may be loaded with the sorbent mixture to provide a sorbent composition having a preferable loading rate (e.g., where the sorbent composition comprises approximately 5-40% (w/w) of the sorbent mixture (or more preferably about 5-30% (w/w) of the sorbent mixture)).

The disclosed sorbent compositions may be utilized in filters, filter material, filter media, or filtering systems. In some embodiments, the sorbent compositions may be entrapped in glass fibrous media (GFM). GFM enables the use of small particle sizes (30-300 microns) and therefore reduce the intra-particle mass transfer resistance (mainly pore diffusion) in desulfurization and regeneration processes to improve performance. In some embodiments, the present compositions can be processed in a wet-lay process wherein the particles are entrapped in a matrix of bonded GFM.

The disclose sorbent composition may exhibit a high sulfur capacity. In further embodiments, the sorbent composition can be regenerated in air for reuse without substantial loss in sulfur capacity. In even further embodiments, the sorbent composition may be very stable over the thermal cycling temperatures that are used for regeneration procedures compared to other compositions utilizing supports other than porous silicon dioxide and using sorbent mixtures other than zinc oxide doped with copper. In even further embodiments, the sorbent composition may be used for sulfur removal at room temperature and at atmospheric pressures.

Procedures for Preparation

In some embodiments, the disclosed sorbent compositions may be prepared from the following exemplary components: (1) an aqueous solution of a zinc oxide precursor (e.g., a zinc salt such as zinc nitrate) and an aqueous solution of a copper precursor (e.g., copper nitrate) as the dopant; and (2) a high surface area silicon dioxide as the support structure. Wet impregnation may be the technique that is used to disperse the solution on the support. The concentration of zinc and copper in the solution and the volume of solution may be determined in order to prepare a sorbent composition having a selected loading rate. In some embodiments, the ideal weight loading for the sorbent composition is approximately 5-40% (w/w) of the sorbent mixture (or more preferably about 5-30% (w/w) of the sorbent mixture).

The support is preferably not in a dry condition prior to impregnation. The support may be in the form of pellets or particles. Preferably, the particle size will be between about 0.1-6.0 mm. In some embodiments, the volume of the aqueous precursor used in the impregnation step preferably may be less than or equal to the pore volume of the porous support. The impregnation solution preferably is introduced to the support as small droplets or as a fine mist that is atomized using air or nitrogen. The resulting wet pellets or particles may be air-dried or vacuum-dried at room temperature. The applied vacuum may be such that the drying rate is 0.05 cc/min or higher. After the drying process, the resulting composition may be calcined in air or an inert gas (e.g., at a temperature of at least about 300° C. (preferably at least about 400° C.) for at least about 0.5 h (preferably at least about 2 h)). It may be desirable to keep the heating time to a minimum during calcination, for example, only enough heating time to ensure the conversion of the zinc nitrate to zinc silver and oxide.

The silicon dioxide support utilized in the present methods typically has a high surface area and may be in the form of silicon dioxide particles. In some embodiments, the silicon dioxide support has a surface area of at least about 100 m$^2$/g and typically about 100-1000 m$^2$/g. In some embodiments, the silicon dioxide support has a surface area of about 150 m$^2$/g or about 250 m$^2$/g.

The silicon dioxide support may be modified prior to impregnation or during impregnation in order to enhance the adhesion and dispersion of the sorbent mixture of ZnO and Cu. For example, the surface charge of the silicon dioxide support may be modified by adjusting the pH of the impregnating solution. In some embodiments, the silicon dioxide support may be treated with steam to improve surface properties prior to impregnation. In further embodiments, the silicon dioxide support may be treated with moisture saturated air prepared from a basic solution prior to impregnation. The silicon dioxide support may be subjected to cyclic oxidation and reduction of the silicon dioxide surface to increase crystal defects on the surface at high temperatures. In even further embodiments, the silicon dioxide support may be treated with ultra-violet radiation prior to impregnation.

The disclosed sorbent compositions further may be utilized in filter material. In some embodiments, the disclosed sorbent compositions may be entrapped in a sinter-locked mesh of fibers and used as a polishing filter material for sulfur removal. In further embodiments, the sorbent composition entrapped in the fiber matrix may be loaded in a reactor bed in layers. For example, each layer of the reactor bed may comprise different filter material that specifically removes different contaminants (e.g., sulfur atoms in fuels, certain aromatics, or adsorbent poisons).

Process Conditions

The sorbent compositions may be utilized in methods for treating gaseous streams, liquid streams, or both. In some embodiments, the sorbent composition may be utilized to treat a hydrocarbon stream (e.g., a fuel stream). The sorbent composition may be loaded into a tubular reactor and packed to minimize the formation of void/dead spaces. The amount of sorbent composition loaded into the reactor may be adjusted based on several factors, including: the expected amount of sulfur present in the stream to be treated; the volume of the stream to be processed per pass; and the concentration of sulfur required after processing. The amount of sorbent composition loaded into the reactor also may be adjusted based on the time/temperature restrictions for the regeneration of the adsorbent bed. The stream may be passed or flowed in the reactor optionally in a direction following the gravitational force (i.e., downward). The desulfurization process may be carried out at room temperature and atmospheric pressures. The bed may be regenerated after reaching the exhaustion point. For example, initially, high velocity air at room temperature or a gas mixture of steam, $CO_2$, $N_2$ and inert gases (for desulfurization performed at high temperatures) may be passed through the reactor to remove any of the residual stream in the intra-particle void space (i.e., in a "blow-down" procedure). Then the gas stream may be changed to an oxidizing agent. Preferably, the oxidizing agent is selected from a group consisting of air, pure oxygen, ozone, hydrogen peroxide, and a combination thereof. The temperature then may be adjusted to about 550-600° C. and maintained for at least about 3 hours. The duration for these steps may vary depending on the depth of the adsorbent bed. The bed may be used for a subsequent cycle after being allowed to cool to room temperature.

In some embodiments, desulfurization may be performed at pressures that are higher than atmospheric pressure. In further embodiments, desulfurization may be performed at temperatures that are greater or less than room temperature in order to modify the desulfurization performance.

The sorbent composition may be packed in a reactor or a container (e.g., a cartridge). In some embodiments, the sorbent composition may be packed in the reactor in a particle size distribution. The selected distribution may reduce the pressure drop over the entire reactor.

The air passed over the exhausted sorbent composition (i.e., "the stripping air") may be recycled by removing the sulfur dioxide in the stripping air that is produced during regeneration. For example, the sulfur dioxide present in the stripping air may be combined with water to form sulfuric acid, which subsequently is removed by condensation.

Fibrous Entrapment

The presently disclosed sorbent compositions may be entrapped in a matrix of fibrous material (e.g., microfibrous or nanofibrous material). In some embodiments, the presently disclosed sorbent compositions are entrapped in a sinter-locked mesh of ceramic fibers (e.g., ceramic microfibers or ceramic nanofibers). The entrapped sorbent compositions may be utilized in treatment systems. In some embodiments, the entrapped sorbent compositions may be utilized as polishing filter media.

In some embodiments, fibrous entrapped sorbent compositions may be prepared by first entrapping a support in a matrix of fibers (e.g., entrapping a silica support in a matrix of fibers). The entrapped support then may be sintered and bonded to the matrix of fibers. The bonded support then may be impregnated with a Cu—ZnO precursor solution as disclosed herein.

Layered Configurations

Filtering systems that comprise layers of the disclosed sorbent compositions also are disclosed. A filtering system may include: (a) a first sorbent composition (optionally entrapped in matrix of fibers), where the first filter sorbent composition preferentially adsorbs a first compound (e.g., a first sulfur compound); and (b) a second sorbent composition (optionally entrapped in a matrix of fibers), where the second filter sorbent composition preferentially adsorbs a second compound (e.g., a second sulfur compound). The filtering system may be layered in a reactor bed or in a cartridge and may comprise a polishing filter layer. The disclosed systems may be utilized in fuel filter assemblies.

In some embodiments, the disclosed filtering systems may comprise a packed bed in a reactor or a cartridge. For example, a packed bed in a reactor or a cartridge may comprise different sorbent compositions. The different sorbent compositions may comprise different sorbent mixtures (e.g., different mixtures of copper doped zinc oxide). The different sorbent compositions may comprise different supports. The different sorbent compositions may have different particle sizes and may function optimally at different temperatures. For example, a sorbent composition with fast mass transfer characteristics (e.g., a high efficiency sorbent composition using dopants, a supported sorbent structure, a small particle size, and microfibrous entrapment) may be used as a polishing filter layer at the downstream end of a packed bed of relatively large size extrudates.

ILLUSTRATIVE EMBODIMENTS

The following list of embodiments is illustrative and is not intended to limit the scope of the claimed subject matter.

Embodiment 1. A sorbent composition comprising a porous support impregnated with a sorbent mixture comprising zinc oxide and copper material, where the sorbent mixture comprises about 20-99% zinc oxide (w/w) and about 1-80% copper material (w/w) (or preferably about 80-99% zinc oxide (w/w) and about 1-20% copper material (w/w) (i.e., where the ratio of zinc oxide to copper material is about (4-99):1))); and the impregnated support comprises about 5-40% of the sorbent mixture (w/w) (or preferably about 5-30% of the sorbent mixture (w/w)).

Embodiment 2. The sorbent composition of embodiment 1, where the sorbent mixture comprises about 90-99% zinc oxide (w/w) and about 1-10% copper material (w/w) (i.e., the ratio of zinc oxide to copper material ratio is about (9-99):1) or the mixture comprises about 95-99% zinc oxide (w/w) and about 1-5% copper material (w/w) (i.e., the ratio of zinc oxide to copper material is about (19-99):1), or the mixture comprises about 80-90% zinc oxide (w/w) and about 10-20% copper material (w/w) (i.e., the ratio of zinc oxide to copper material is about (4-9):1), or the mixture comprises about 80-95% zinc oxide (w/w) and about 5-20% copper material (w/w) (i.e., the ratio of zinc oxide to copper material is about (4-19):1).

Embodiment 3. The sorbent composition of embodiment 1 or 2, where the copper material is selected from a group consisting of copper metal, copper oxide, copper nitrate, copper acetate, or combinations thereof.

Embodiment 4. The sorbent composition of any of embodiments 1-3, where the copper material is copper metal, copper oxide, or a mixture thereof.

Embodiment 5. The sorbent composition of any of embodiments 1-4, where the support is in the form of powder, grains, pellets, extrudates, or combinations thereof.

Embodiment 6. The sorbent composition of any of embodiments 1-5, where the support is in the in the form of particles.

Embodiment 7. The sorbent composition of embodiment 6, where the particles have a pore volume of about 0.1-3.0 cc/g.

Embodiment 8. The sorbent composition of embodiment 6, where the particles have a surface area of about 100-1000 $m^2/g$.

Embodiment 9. The sorbent composition of embodiment 6, where the particles have an average diameter of about 30-6000 microns.

Embodiment 10. The sorbent composition of embodiment 6, where the particles have an average diameter of about 30-300 microns.

Embodiment 11. The sorbent composition of embodiment 6, where the particles have an average pore diameter of about 0.2-70 nm.

Embodiment 12. The sorbent composition of any of embodiments 1-11, where the support comprises silicon dioxide (e.g., MCM silicon dioxide), titanium dioxide, aluminum oxide, or activated carbon.

Embodiment 13. A filter material comprising the sorbent composition of any of embodiments 1-12 entrapped in a matrix of fibers.

Embodiment 14. The filter material of claim 13, where the fibers have an average diameter of about 2-20 microns and the particles have an average diameter of about 30-300 microns.

Embodiment 15. The filter material of embodiment 13 or 14, where the sorbent composition is bonded to the matrix of fibers.

Embodiment 16. The filter material of any of embodiments 13-15, where the sorbent composition is bonded to the matrix of fibers by performing a sintering process.

Embodiment 17. The filter material of any of embodiments 13-16, where the fibers are ceramic fibers, metal fibers, or polymer fibers.

Embodiment 18. A method for preparing the sorbent composition of embodiment 1, the method comprising: (a) impregnating porous particles with a solution comprising a dissolved zinc precursor (e.g., dissolved zinc salt) and a dissolved copper precursor (e.g., dissolved copper salt), where, optionally, the volume of the solution is no more than the pore volume of the porous particles; (b) drying and calcining the impregnated particles.

Embodiment 19. The method of embodiment 18, where step (b) comprises heating the impregnated particles at a temperature of about 20-200° C. for at least about 2 hours.

Embodiment 20. The method of embodiment 18 or 19, where the zinc salt is selected from a group consisting of zinc nitrate, zinc acetate, and a mixture thereof and the copper salt is selected from a group consisting of copper nitrate, zinc acetate, and a mixture thereof.

Embodiment 21. The method of any of embodiments 18-20, where the step of impregnating is performed by incipient wetness impregnating, spray impregnating, or a combination of both.

Embodiment 22. The method of any of embodiments 18-20, where the step of drying is performed by a step selected from a group consisting of: drying at a temperature range of about 20-200° C.; drying in sub-atmospheric pressures of about 0.001-759 torr; drying in the presence of flowing gas stream; and a combination thereof.

Embodiment 23. The method of embodiment 22, where the flowing gas stream comprises a gas selected a group consisting of air, nitrogen, oxygen, argon, helium, and a combination thereof.

Embodiment 24. The method of any of embodiments 18-23, where calcining is performed by heating the dried particles to a temperature in a range of about 300-600° C. for at least about 0.5 hours and contacting the dried particles with a flowing gas stream.

Embodiment 25. The method of embodiment 24, where the flowing gas stream comprising a gas selected from a group consisting of air, pure oxygen, ozone, hydrogen peroxide, and a combination thereof.

Embodiment 26. A process for removing sulfur compounds from a stream (e.g., a gaseous stream such as a gaseous hydrocarbon stream), the process comprising passing the stream through an effective amount of the sorbent composition of claim 1 for a sufficient period of time to reduce sulfur compounds in the stream to a level of no more than about 200 ppmv, (preferably to a level of no more than about 10 ppmv, 1 ppmv, or 0.1 ppmv).

Embodiment 27. The process of embodiment 26, where the sorbent composition is contained within a cartridge having a top and a bottom and the stream passes from the top of the cartridge to the bottom of the cartridge.

Embodiment 28. The process of embodiment 27, further comprising removing sulfur compounds adsorbed to the sorbent composition and any retained hydrocarbons, thereby regenerating the sorbent composition.

Embodiment 29. The process of embodiment 28, where the step of removing sulfur compounds adsorbed to the sorbent composition and any retained hydrocarbons is performed by heating the sorbent composition to a temperature between about 300-600° C. and passing an oxidizing agent (e.g., air, pure oxygen, ozone, hydrogen peroxide, and a combination thereof) or a mixture of an oxidizing agent and a relatively inert gas compound (e.g., nitrogen, helium, argon, and steam) over the sorbent composition.

Embodiment 30. The process of any of embodiments 27-29, where after removing the sulfur compounds adsorbed to the sorbent composition and any retained hydrocarbons the sorbent composition has a sulfur capacity that is not substantially reduced as compared to sulfur capacity for the sorbent composition prior to use (e.g., the regenerated sorbent composition may have a sulfur capacity that is at least about 80% of sulfur capacity for the sorbent composition prior to use, and preferably at least about 85%, 90%, or 95% of the sulfur capacity for the sorbent composition prior to use).

Embodiment 31. A filtering system comprising: (a) a first sorbent composition according to any of claims 1-12 (optionally entrapped in a matrix of fibers), where the first sorbent composition preferentially adsorbs a first compound; and (b) a second sorbent composition according to any of claims 1-12, where the second sorbent composition preferentially adsorbs a second compound (e.g., where the first and second sorbent compositions are different sorbent compositions and the first and second compounds are different sulfur compounds).

Embodiment 32. The filter system of embodiment 31 contained in a cartridge.

Embodiment 33. A fuel filter assembly comprising the filtering system of embodiment 31.

EXAMPLES

The following examples are illustrative and are not intended to limit the scope of the claimed subject matter.

Example I

A. Background

Addition of transition metals can significantly change desulfurization performance. The function of these transition metal dopants are to: (i) increase the surface area and reduce the grain size; (ii) catalyze the desulfurization reaction by functioning as sulfur atom transporter; and (iii) generate more crystal defects such as oxygen vacancies in the e.g., ZnO host crystallites. Zinc oxide itself is a transition metal oxide, and oxygen vacancies are the major defects in the ZnO crystallite. Oxygen vacancies are acceptors for oxygen and sulfur atoms, and the active centers for chemical reactions, such as hydrogenation and methanation. These defects/vacancies increase the mobility of oxygen and sulfur atoms. At higher temperatures, this effect is more significant. At room temperature, a higher concentration of oxygen vacancy on the surface of ZnO grain will accelerate the sulfidation reaction. Based on the above noted rationale, this study demonstrates that transition metal oxides can be fortuitously used to introduce high levels of oxygen vacancies into ZnO thereby providing desirable desulfurization performance. Because Zn is at an oxide state of 2 in ZnO, the metal atoms with similar size of Zn atom may replace the Zn atoms in ZnO lattice. Metal atoms having a higher oxidation state than Zn will generate ZnO vacancies and metal atoms having a lower oxide state will generate oxygen vacancies. Therefore, the metals in group IB, such as copper, silver, and gold should be the best candidates to generate oxygen vacancies to facilitate the desulfurization reaction. The simplified mechanism is illustrated in FIG. 1.

The Center for Microfibrous Materials Manufacturing (CM3) at Auburn University has developed several microfibrous entrapped ZnO based sorbents for gas phase desulfurization at various temperatures. Among them, Ni fiber entrapped ZnO/ACP prepared by incipient wetness impregnation demonstrated 3-fold longer breakthrough times for $H_2S$ compared to packed beds of several carbon-based sorbents obtained from MSA, 3M, Willson, and Scott with doubled bed thickness. However, the Ni microfibrous entrapped ZnO/ACP was not regenerable because activated carbon particles were used as the support. In this study, nine transition metal doped ZnO based sorbents were evaluated for $H_2S$ removal in the presence of CO, $CO_2$ and water at room temperature, low temperature (200° C.) and moderate temperature (400° C.). Microfibrous entrapped doped sorbents were also tested at room temperature.

B. Examples of Sorbent Composition, Methods of Preparation and Use

The disclosed sorbent compositions may include ZnO and a mixed oxide dopant (e.g., a Group IB metal (e.g., Cu or Ag) or an oxide thereof) supported on a material such as $SiO_2$, (e.g., MCM $SiO_2$), $TiO_2$, or $Al_2O_3$. The support may provide high dispersion/accessibility of the active phase at low temperature. The dopant may assist the solid state diffusion and capacity for the composition (especially at low temperatures). The $SiO_2$ support may provide good structural stability and multi-cycle activity maintenance after regeneration in flowing air/oxygen at high temperatures.

The sorbent composition may be prepared using an impregnation procedure. For example, an incipient wetness technique may be utilized to introduce a Cu-doped ZnO composition into the pores of the support. Solutions that include zinc salt and copper salt may be used to prepare the sorbent compositions (e.g., $Zn(Ac)_2$, $Zn(NO_3)_2$ solutions at a concentration of about 2 mol/L, to prepare a sorbent composition having Zn loading of about 2-40 wt %).

The support material may comprise relatively small particles having relatively high surface area and porosity. For example, the particles may have a size of about 30-300 μm, a surface area of about 100-1000 m2/g, and a porosity larger than about 0.1 cc/g (preferably larger than about 0.3 cc/g).

The zinc oxide may be doped with copper material or another Group IB dopant. In some embodiments, the impregnating mixture of zinc oxide and copper material may comprise copper in the range of about 1-80% (w/w). Preferably, the impregnating mixture of zinc oxide and copper material comprises copper in the range of about 1-20% (w/w), 1-10% (w/w), or 1-5% (w/w).

The disclosed sorbent compositions may be utilized in systems and methods for removing sulfur compounds from a gas stream (e.g., $H_2S$, COS, methyl mercaptan, thiophene, benzothiophene, dibenzothiophene, substituted thiophenes, and the like). Suitable conditions for desulfurization may include 20-500° C. for reformates or 20-100° C. for air streams.

The disclosed sorbent compositions may be regenerated after use (i.e., exhausted sorbent compositions.) Suitable methods for regenerating an exhausted sorbent composition conditions may include passing air over the exhausted sorbent composition and heating the exhausted sorbent composition to about 300-600° C. In some embodiments, air may be passed over the exhausted sorbent composition in a direction opposite to the stream flow during adsorption/reaction.

The disclosed sorbent compositions may be utilized in filters, filter materials, filter media, or filtering systems. Filter material may comprise the disclosed sorbent compositions entrapped and/or bonded in a matrix of fibers. Bonding may be performed by sintering the filter material. Suitable fibers may include silica or glass fibers, metal fibers, or polymeric fibers. The fibers may include microfibers, nanofibers, or both. The filters, filter materials, filter media, or filtering systems may be utilized to protect fuel cells, and/or other sulfur sensitive process hardware.

The disclosed sorbent compositions may be utilized to prepare polishing filter layers for use in filter beds. A polishing filter layer may be prepared by sizing the disclosed sorbent compositions to about 30-300 μm and entrapping or bonding the sized sorbent composition in a matrix of microfibers. The polishing filter layer may be positioned downstream of a packed bed comprising the sorbent composition to synergistically combine the high volume loading and lower pressure drop of the packed bed along with the low exit concentration and high heterogeneous contacting efficiency of the polishing layer. The polishing layer may be utilized to reduce the size and the operating temperature of a filter element used in conjunction with the polishing layer.

The disclosed filters, filter materials, filter media, or filtering systems may be manufacturing by any suitable manufacturing process. In some embodiments, the filters, filter materials, filter media, or filtering systems are manufactured using a high speed roll-to-roll wet lay manufacturing process.

C. Results and Discussion

1. Support Screening

Figure 2:
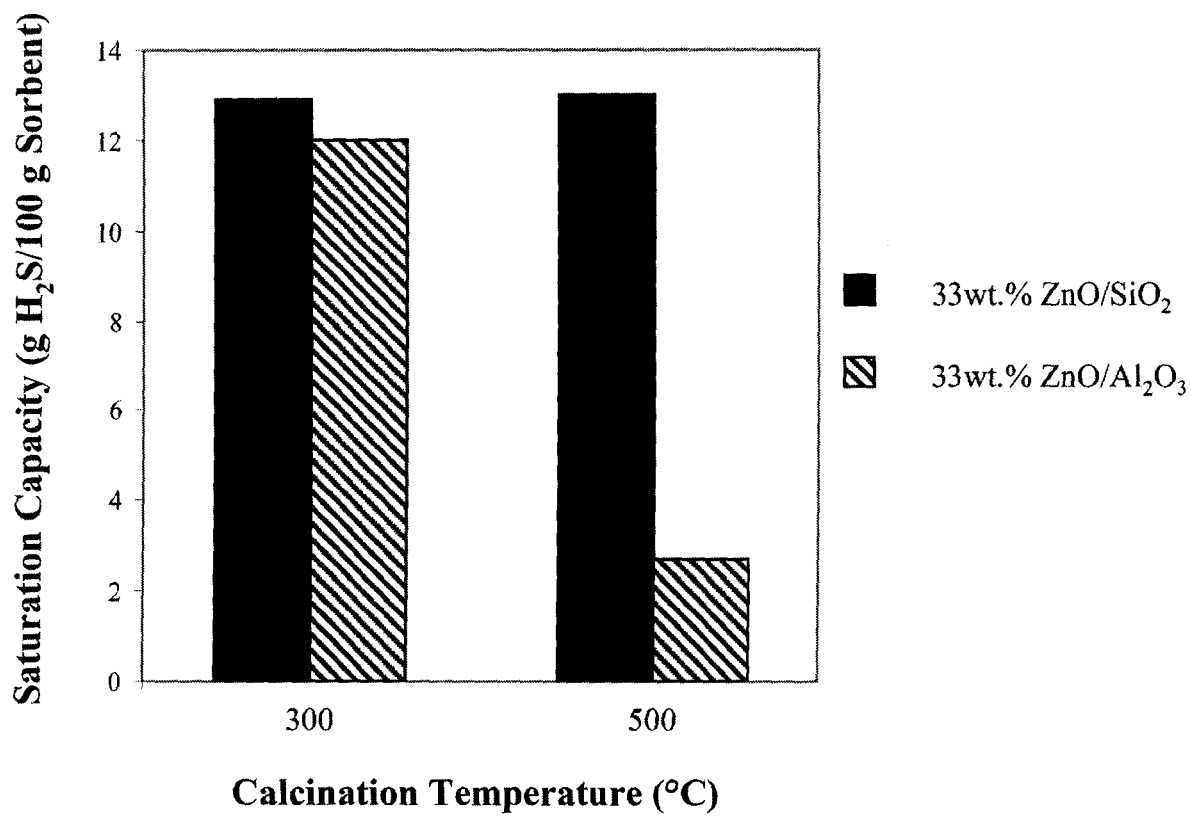
FIG. 2 illustrates the $H_2S$ saturation capacity for $SiO_2$ and $Al_2O_3$ after calcining.

Two supports were evaluated, $SiO_2$ and $Al_2O_3$, with respect to supporting ZnO. Silicon dioxide exhibited a superior $H_2S$ saturation capacity in comparison to $Al_2O_3$ after calcining. (See FIG. 2).

Figure 3:
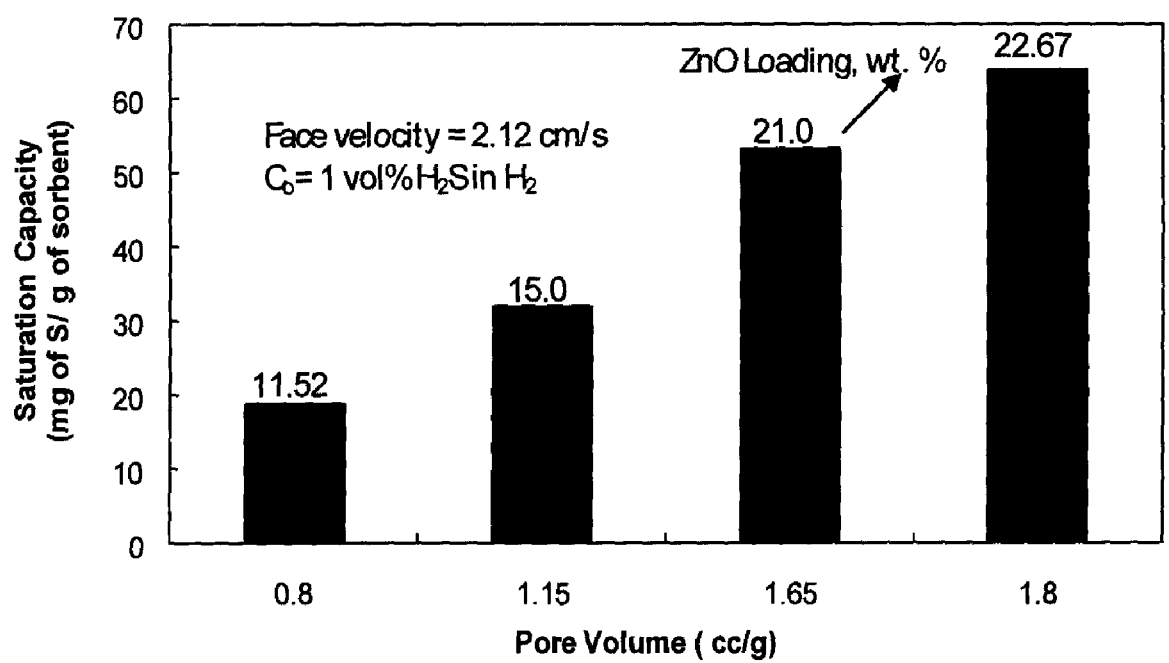
FIG. 3 illustrates the $H_2S$ saturation capacity for $SiO_2$ with various loading rates of ZnO. The sorbents were calcined at 350° C. for 1 hour.

Higher single step impregnation loading of ZnO is possible on silica samples of larger pore volumes. As presented in FIG. 3, the adsorption capacity increases significantly with the increase in pore volume and subsequently the ZnO loading. Zinc oxide was loaded on silica particles having varying pore volumes. Four sorbent compositions were prepared having the following combinations of loading rate-pore volumes: 11.52 wt. %-0.8 cc/g; 15.0 wt. %-1.15 cc/g; 21.0 wt. %-1.65 cc/g; or 22.67 wt. %-1.8 cc/g; respectively). The four sorbent compositions thus prepared were calcined at 350° C. for 1 hour and assessed for $H_2S$ saturation capacity. (See FIG. 3). The increasing trend of the saturation capacity may be attributed to the increasing content of active ZnO phase inside the pores of silica.

2. Doped $Zn/SiO_2$ Sorbent

Figure 4:
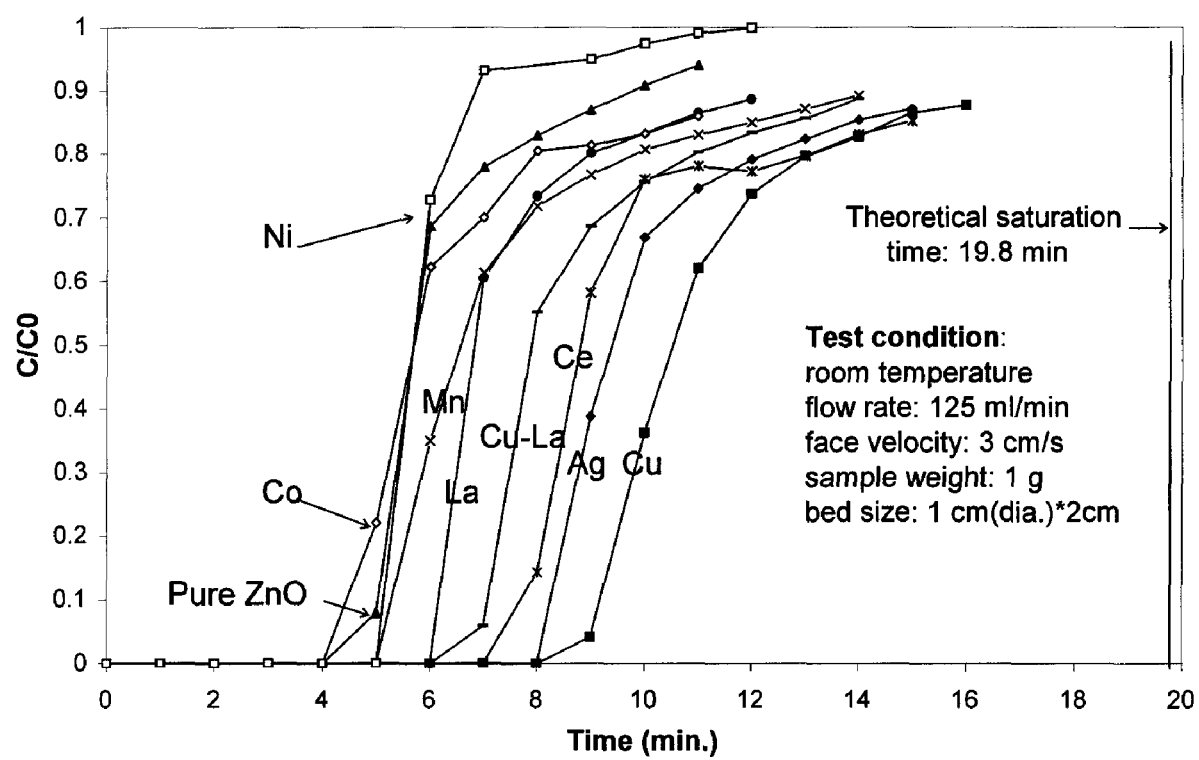
FIG. 4 illustrates the breakthrough curves of transient metal doped ZnO sorbent tested at room temperature.

Nine transition metal doped $ZnO/SiO_2$ sorbents (ratio of doped metal:Zn=1:19, and a general formula of $M_{0.05}Zn_{0.95}O$) and $ZnO/SiO_2$ were tested at room temperature. In each test, the packed bed contained 1 g of sorbent. The breakthrough curves and calculated capacities are shown in FIG. 4 and Table 1.

TABLE 1

Sulfur capacities of several doped $ZnO/SiO_2$ sorbents

| Dopant | Saturation Capacity[1] | | Breakthrough Capacity* |
|---|---|---|---|
| | (g S/g ZnO) | % of theor.[2] | (g S/g ZnO) |
| CuO | 0.213 | 54 | 0.163 |
| $Ag_2O$ | 0.189 | 48 | 0.163 |
| Ce | 0.177 | 45 | 0.142 |
| $CuO-La_2O_3$ | 0.161 | 41 | 0.122 |
| $La_2O_3$ | 0.140 | 35 | 0.122 |
| $MnO_x$ (1 < x < 1.5) | 0.132 | 33 | 0.102 |
| NiO | 0.113 | 29 | 0.102 |
| $CoO_x$ (1 < x < 1.5) | 0.113 | 29 | 0.081 |
| ZnO | 0.113 | 29 | 0.081 |

[1]Sulfur capacity calculated base on $t_{1/2}$ concept. Assume the sorbents are pure ZnO;
[2]% of theoretical saturation capacity = capacity/theoretical saturation capacity × 100%
Note:
adiabatic temperature rise at the test condition is 38° C.

Most doped ZnO sorbents demonstrated improvements in both saturation capacity and breakthrough capacity. Among all the doped sorbents, copper-doped $ZnO/SiO_2$ sorbents (Cu—$ZnO/SiO_2$) showed highest sulfur capacity based on saturation capacity and breakthrough capacity of 0.213 g sulfur/g ZnO and 0.163 g sulfur/g ZnO, respectively, which were twice those of $ZnO/SiO_2$ at 0.113 g sulfur/g ZnO and 0.081 g sulfur/g ZnO for saturation capacity and breakthrough capacity, respectively. The capacity of silver doped $ZnO/SiO_2$ (Ag—$ZnO/SiO_2$) ranked second at room temperature. Other metal dopants, such as Ni, Co, Mn and La, which have oxide states of 2+ or 3+, did not demonstrate significant improvement in sulfur capacity. The addition of $Al^{3+}$ and $Fe^{3+}$ did not demonstrate positive effects on the sulfur capacity and reaction rate. The addition of $Al^{3+}$ even showed a negative effect on sulfur capacity. Moreover, copper dopants actually did not show significant decrease in the ZnO grain. Therefore, these results support the oxygen vacancy theory. The addition of copper or silver may introduce more oxygen vacancies and therefore enhanced the oxygen mobility. The addition of copper may yield a smaller crystal size of ZnO and expose more ZnO to the challenge gases than the addition of silver, because silver has larger size than copper, which may explain the observation that Cu—ZnO/SiO$_2$ demonstrated better performance than Ag—ZnO. The effect of cerium doped ZnO demonstrated the third highest capacity. The function of cerium may be different from Ag and Cu, where the presence of cerium may reduce the particle size and facilitate dispersion of ZnO on the support. Reduced cerium also may introduce oxygen vacancies in the oxide matrix.

3. Effect of Cu Doping Level

Figure 5:
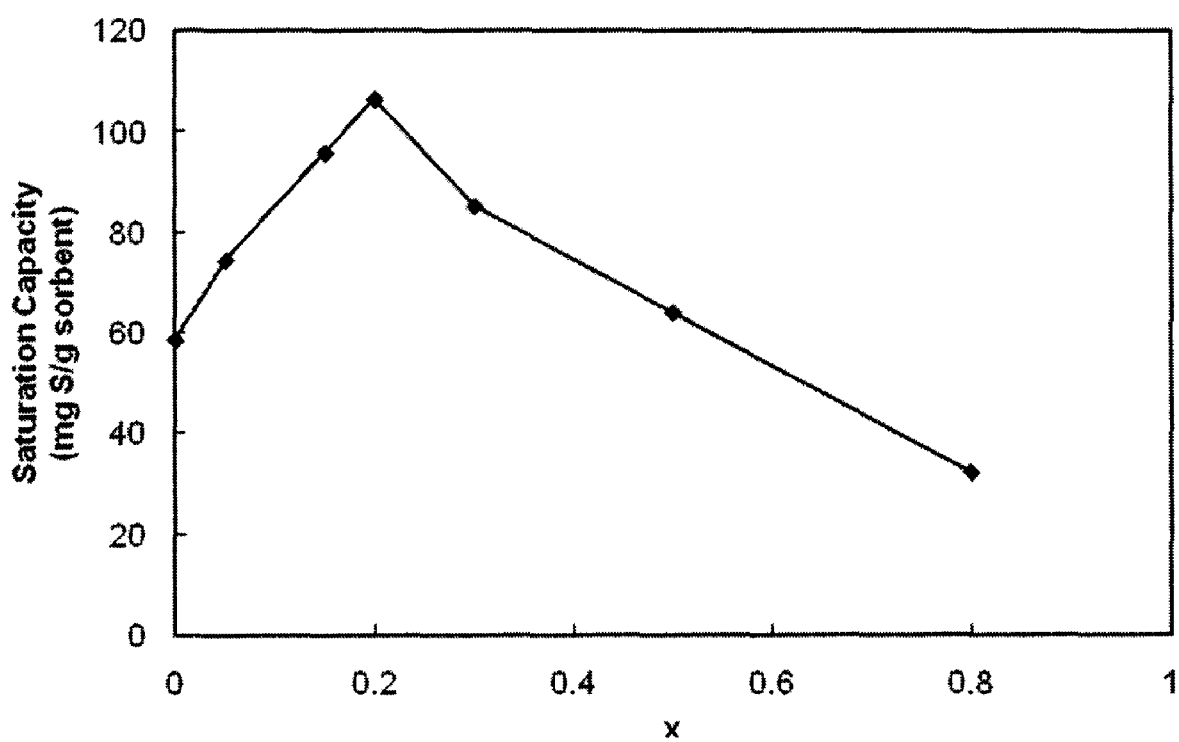
FIG. 5 illustrates the $H_2S$ saturation capacities for Cu—ZnO/$SiO_2$ (metal oxide loading=34 wt. %) using different doping ratios: $Cu_xZn_{(1-x)}O/SiO_2$, where x=0, 0.05, 0.15, 0.2, 0.3, 0.5, or 0.8. Sorbents were calcined at 350° C. for 1 hour and tested with a challenge gas of 1 vol. % $H_2S$—$H_2$ at a face velocity of 2.12 cm/s at room temperature.

Several copper doped ZnO/SiO$_2$ sorbent composition having various Cu atomic fractions (x) were prepared using the SiO$_2$ particles with BET (Brunauer, Emmett and Teller) surface of 300 m$^2$/g and pore volume of 1.65 cc/g. Each sorbent (0.5 g) was tested at room temperature. The experimental results are shown in FIG. 5. Because total metal loading and support were the same for all the sorbents, the above-described results reveal the effect of the Cu/Zn ratio in the sorbents.

As shown in FIG. 5, the sulfur saturation capacity increases with x until it reaches a maximum value of 106 mg S/g adsorbent at x=0.2. Further increases in copper fraction result in a sorbent having a lower saturation capacity. Due to the fixed metal loading, the metal oxide (including ZnO and Cu) utilization follows the same trend as saturation capacity. This indicates that a ratio of Zn/Cu of about 4:1 yields the highest metal utilization (74%), which is 1.8 times larger than that of the undoped ZnO/SiO$_2$ sorbent.

4. Effects of Water, CO and CO$_2$ at RT

Figure 6:
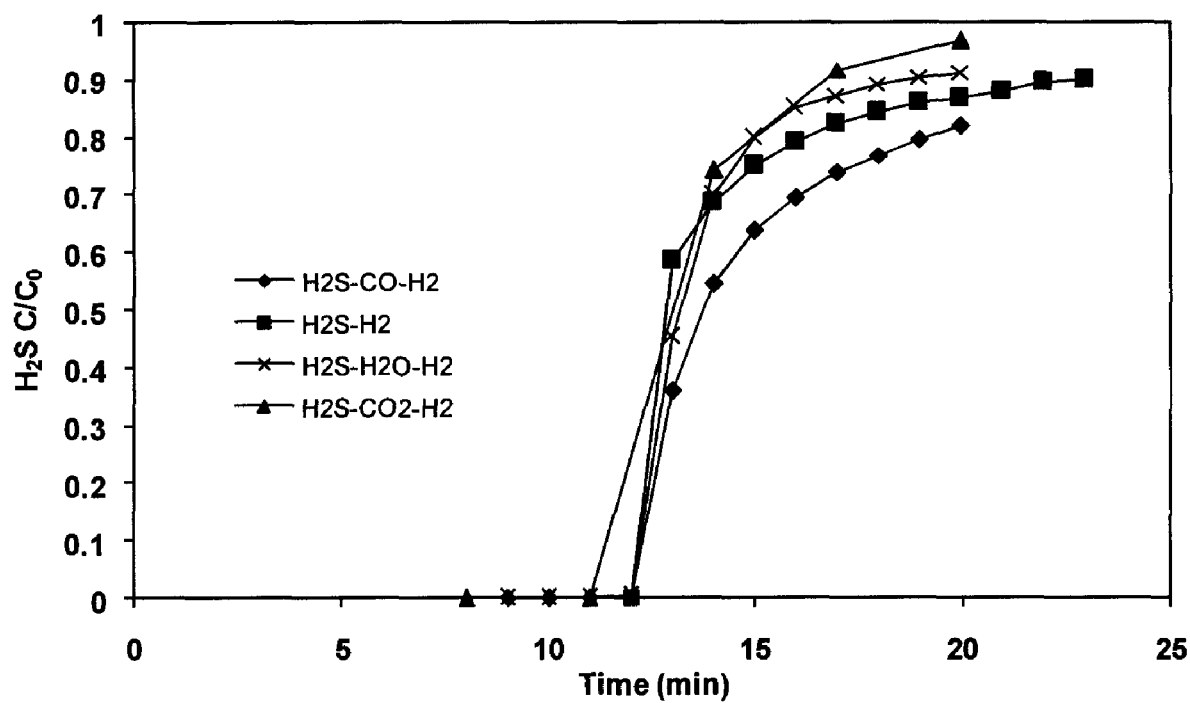
FIG. 6 illustrates the breakthrough curves of Cu—ZnO/$SiO_2$ tested at room temperature in the presence of water, CO, or $CO_2$. In each experiment, 0.5 g Cu—ZnO/$SiO_2$ was loaded and tested with 8000 ppmv $H_2S$ at a face velocity of 2.3 cm/s.

Water, CO and CO$_2$ have strong effects on the desulfurization performance at low temperatures. In this section, the effects of water, CO and CO$_2$ at room temperature (20° C.) were investigated. In the test for water, 3 vol % water was introduced to the packed bed by passing H$_2$ (60 ml/min) through a vaporizer at 30° C. In the tests for CO and CO$_2$, 30 vol % CO/CO$_2$ (30 ml/min STP) was added to the flow consisting of 40 vol % H$_2$S—H$_2$ (40 ml/min STP) and 30 vol % H$_2$ (30 ml/min STP). In each of the tests, the total gas flow rate was maintained at 100 cm$^3$/min STP and the H$_2$S concentration was maintained at 8000 ppmv. The breakthrough curves are shown in FIG. 6. The breakthrough curves tested with H$_2$S—H$_2$ is shown for comparison. The outlet H$_2$S concentrations in all the tests break at almost the same time. This suggests that water, CO and CO$_2$ have no significant effect on the breakthrough time and desulfurization performance at room temperature. No COS formation was detected in the presence of CO and CO$_2$. Water did not show any hindering effect on desulfurization performance.

5. Temperature Effects

Figure 7:
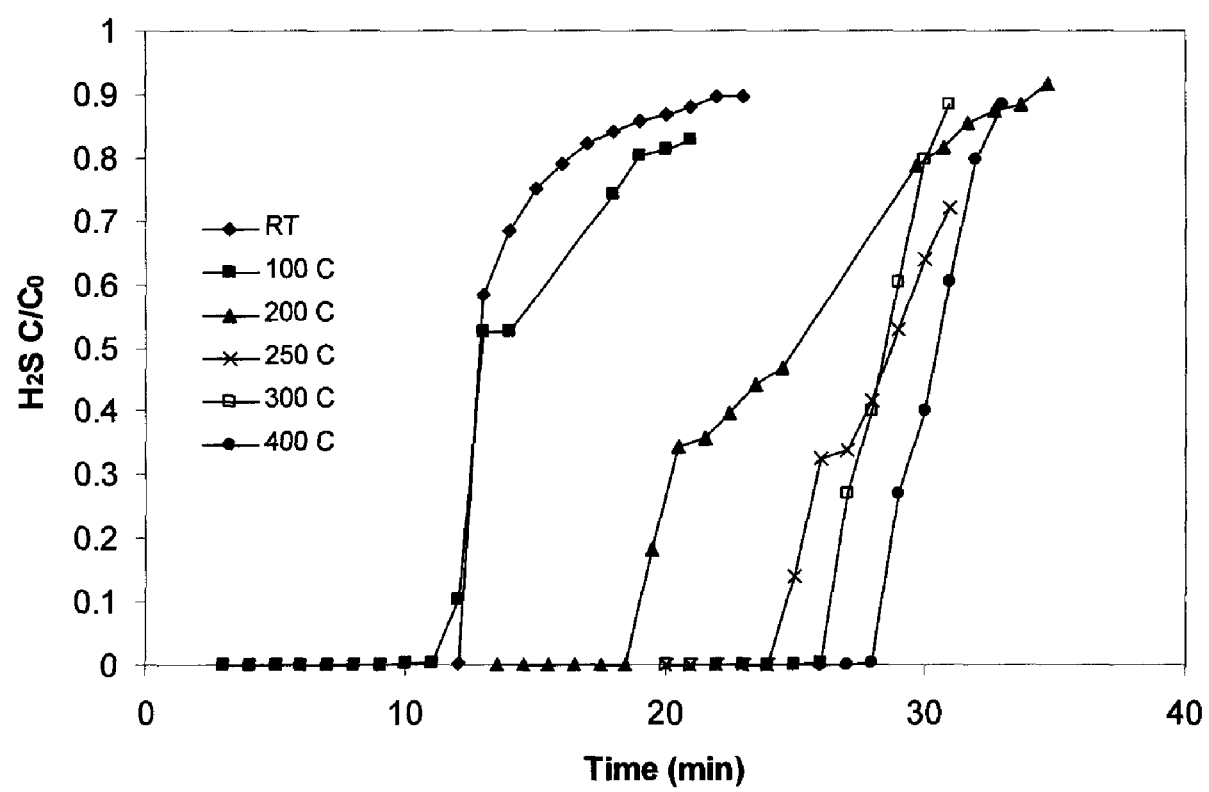
FIG. 7 illustrates the breakthrough curves of Cu—ZnO at various desulfurization temperatures. In each experiment, 0.5 g Cu—ZnO/$SiO_2$ was loaded and tested with 8000 ppmv $H_2S$ at a face velocity of 2.3 cm/s.
Figure 8:
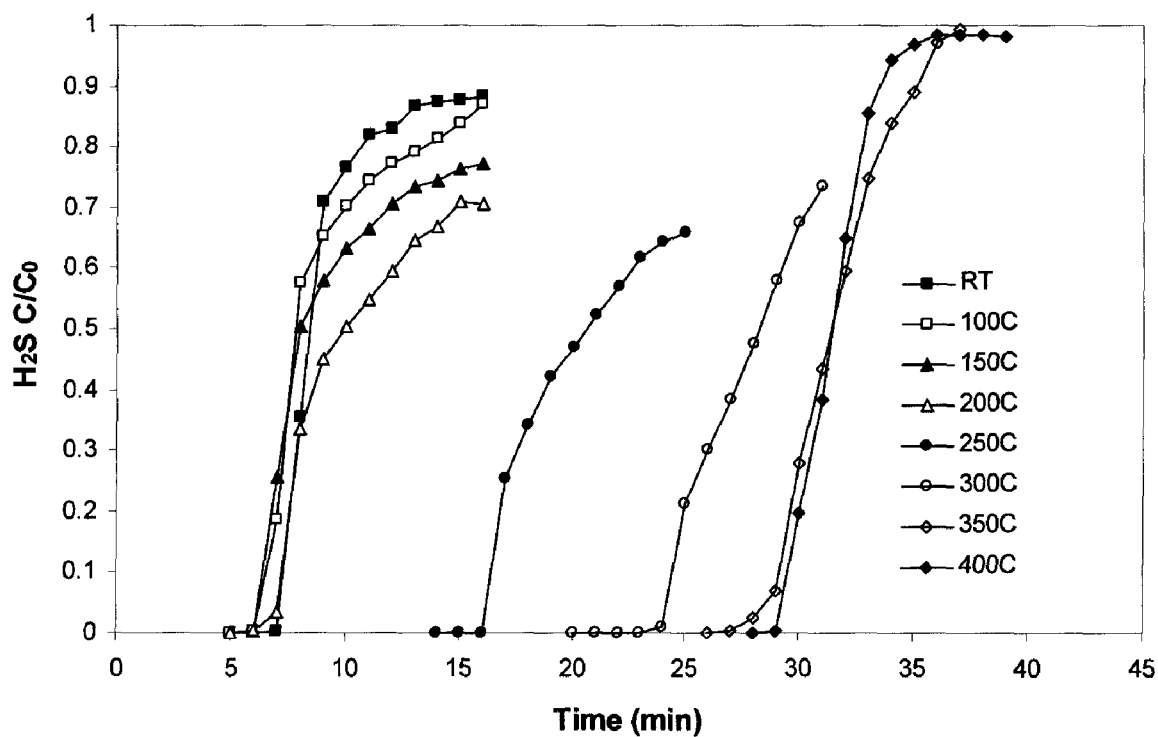
FIG. 8 illustrates the breakthrough capacity of ZnO/$SiO_2$ at various desulfurization temperatures. In each experiment, 0.5 g ZnO/$SiO_2$ was loaded and tested with 8000 ppmv $H_2S$ at a flow rate of 100 $cm^3$/min STP.
Figure 9:
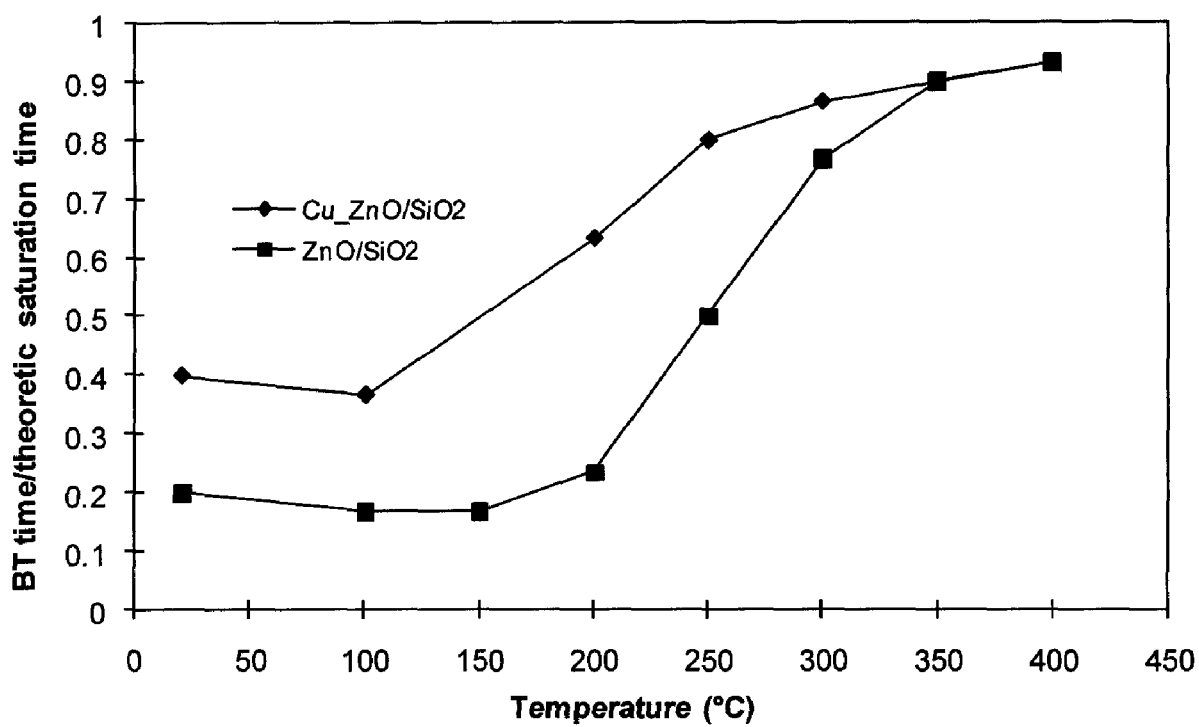
FIG. 9 illustrates the breakthrough time/theoretic saturation time of ZnO/$SiO_2$ and Cu—ZnO/$SiO_2$ at various desulfurization temperatures.

The doped ZnO/SiO$_2$ sorbents might be expected to be very sensitive to changes in temperature even in relative low temperature ranges as compared with the neat ZnO/SiO$_2$ sorbents. The breakthrough curves of Cu—ZnO/SiO$_2$ and ZnO/SiO$_2$ at different temperatures are shown in FIGS. 7 and 8, and the breakthrough capacities at various temperatures are shown in FIG. 9. The result of Zn/SiO$_2$ sorbent is also shown in FIG. 9 for comparison.

Another phenomena noted in the shape of breakthrough curves is the step curb, which was not observed in all ZnO/SiO$_2$ tests nor in the Cu—ZnO/SiO$_2$ tests at temperatures above 300° C. This suggests that new reaction mechanisms, such as CuO reduction and grain cracking, may be involved in the desulfurization reaction at low temperatures. FIGS. 7 and 9 suggest that: the desulfurization performance of Cu—ZnO/SiO$_2$ below 100° C. is stable; the desulfurization performance increases above 100° C.; and the desulfurization performance became stable again at temperature above 300° C. The breakthrough time/saturation time vs. Temperature ($t_b t_s$~T plot) of two sorbents shared some characteristics in common. At low temperatures (T<150° C.), a decrease in capacity was observed for both sorbents as the temperature was increased. The increase in temperature reduced the absorption of H$_2$S on the sorbent, but it did not significantly change the apparent reaction rate at low temperatures, therefore the breakthrough capacity dropped. The increase in breakthrough time (capacity) with temperature is shown in FIG. 9. Compared with the ZnO/SiO$_2$, at the same desulfurization temperature, Cu—ZnO/SiO$_2$ demonstrated larger breakthrough capacity (time). At low temperatures the difference between these two is more significant. The $t_b/t_s$~T plot of ZnO is much sharper than that of Cu—ZnO/SiO$_2$, which suggests higher activation energy was required for ZnO. The difference between this two became less distinct at higher temperatures.

6. Regeneration Test 6.(a) Single Cycle Test

Figure 10:
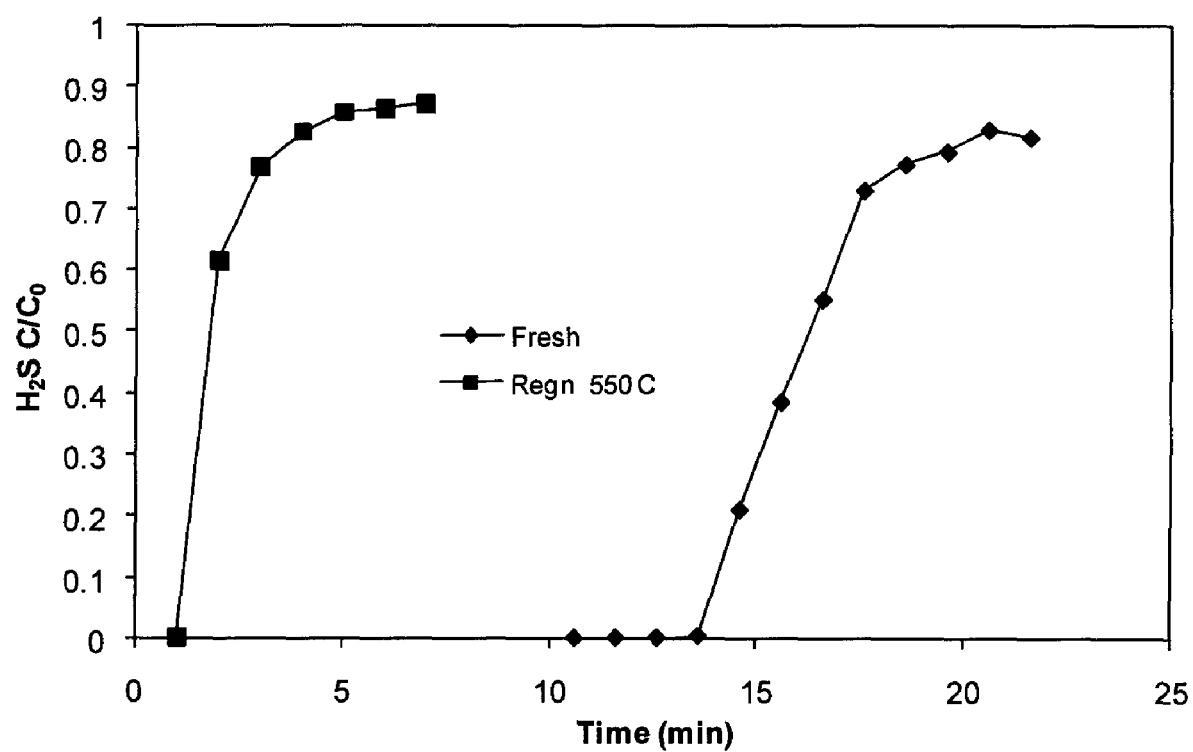
FIG. 10 illustrates the breakthrough curves of fresh and regenerated Sud-Chemie ZnO particles (105-250 μm, 25 $m^2$/g). In each experiment, 0.5 g of sorbent was tested at room temperature (20° C.) with 8000 ppmv $H_2S$ at a face velocity of 2.3 cm/s.
Figure 11:
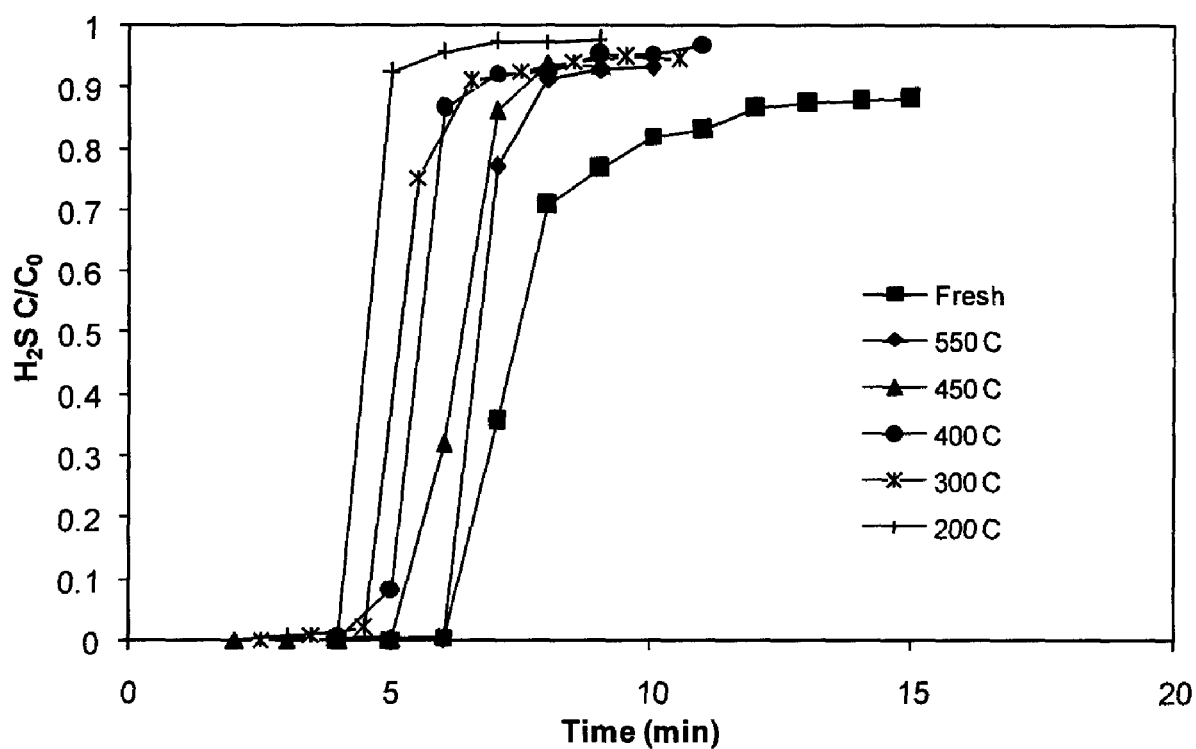
FIG. 11 illustrates the breakthrough curves of regenerated ZnO/$SiO_2$ at various regeneration temperatures. Sorbent was tested at room temperature (20° C.) with 8000 ppmv $H_2S$ at a face velocity of 2.3 cm/s.
Figure 12:
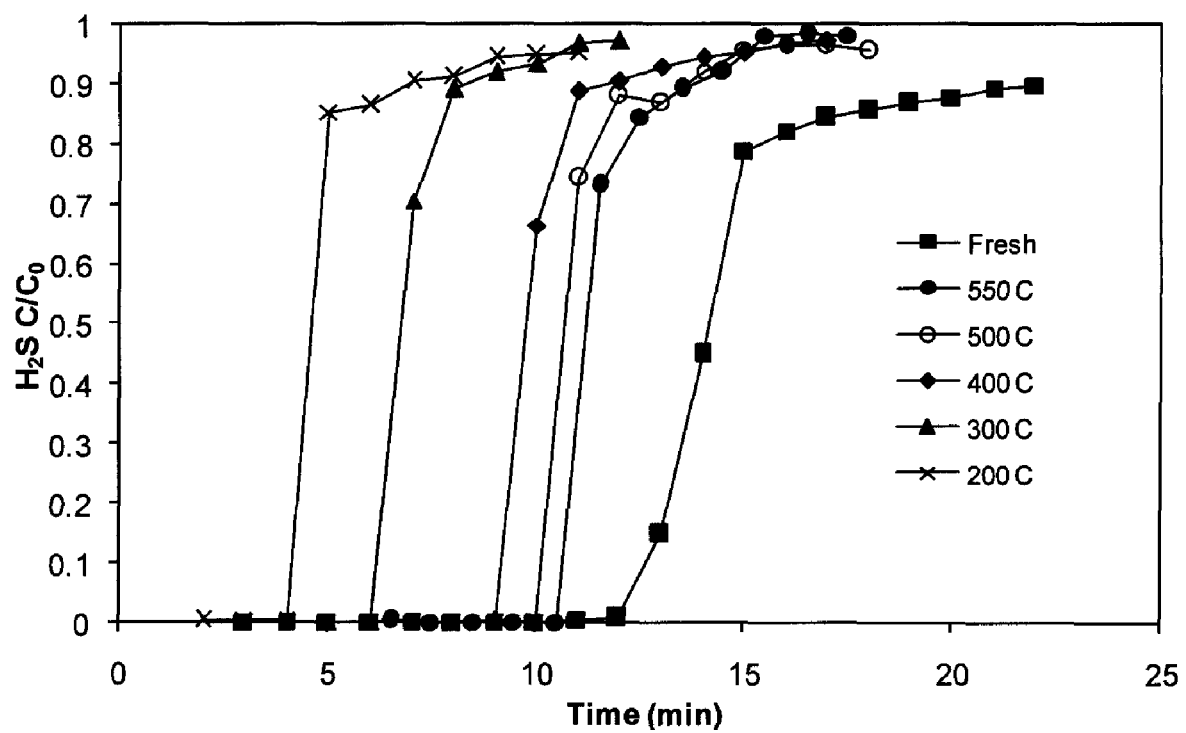
FIG. 12 illustrates the breakthrough curves of regenerated Cu—ZnO/$SiO_2$ at various regeneration temperatures. Sorbent was tested at room temperature (20° C.) with 8000 ppmv $H_2S$ at a face velocity of 2.3 cm/s.

Several sorbents was tested for regenerable applications. The breakthrough curves of Sud-Chemie ZnO and ZnO/SiO$_2$ sorbents are shown in FIGS. 10 and 11, respectively. The breakthrough curves of Cu—ZnO/SiO$_2$ regenerated at various temperatures are shown in FIG. 12. FIG. 10 suggests that ZnO particle (0.5 g) prepared by crushing ZnO extrudate is a good sorbent at room temperature, where the sorbent had a breakthrough time of 14 min and this breakthrough time was higher than that Cu—ZnO/SiO$_2$ sorbent. However, the ZnO sorbent was barely regenerated after 1 hour regeneration at 550° C. Therefore, it was literally considered as a non-regenerable sorbent for room temperature applications.

Figure 13:
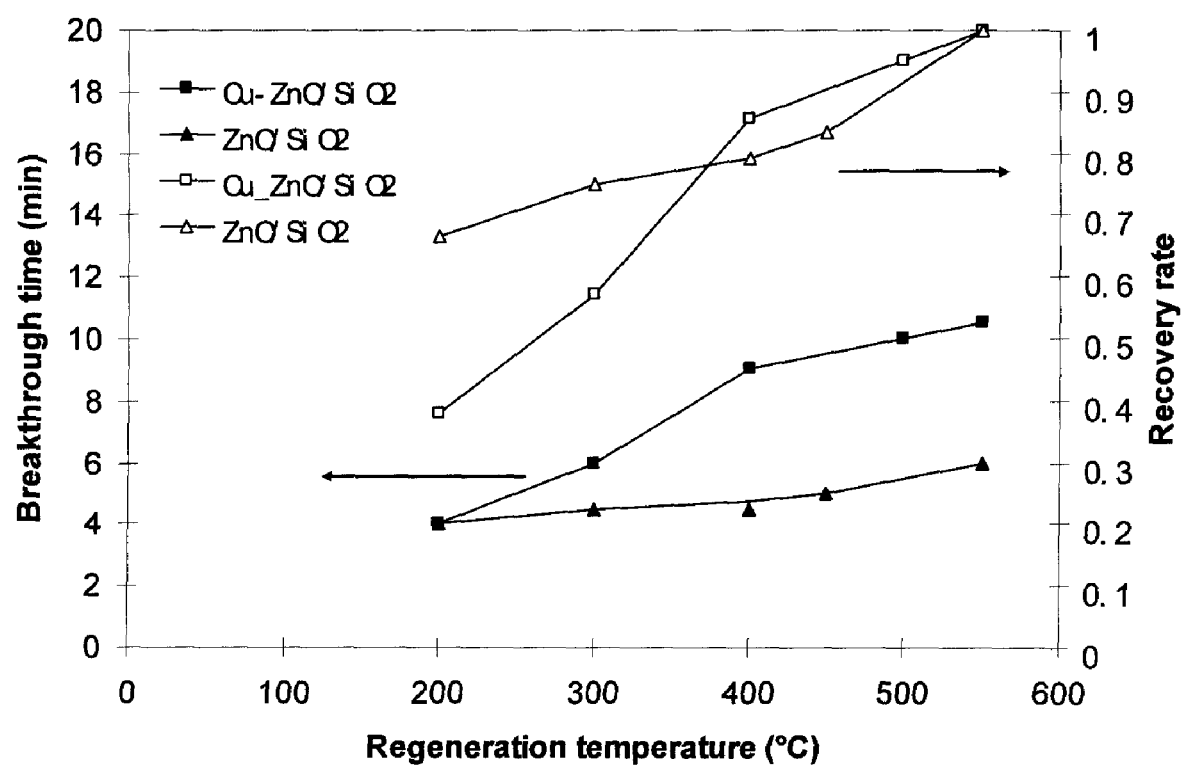
FIG. 13 illustrates the results of experiments in which the regeneration characteristics of ZnO/$SiO_2$ and Cu—ZnO/$SiO_2$ sorbents were compared. Regenerated sorbents were tested at room temperature (20° C.). Recovery rate is defined as the breakthrough time of regenerated sorbent/breakthrough time of the fresh sorbent.

In contrast, the ZnO/SiO$_2$ sorbent has a good regenerability as shown FIG. 11. The sulfur capacity can be recovered at a regeneration temperature above 550° C. for 1 hour. At low temperature, it can not be fully recovered, but retained longer breakthrough time (capacity) than Sud-Chemie as described above. Similar results were also observed in the regeneration of Cu—ZnO/SiO$_2$ sorbents as shown in FIG. 12. The regeneration characteristic patterns of two supported sorbents are shown in FIG. 13. In FIG. 13, the recovery rate was defined as the ratio of a breakthrough time after regeneration to that of the fresh one.

As shown in FIG. 13, the two regenerated sorbents yielded the same breakthrough time at a regeneration temperature of 200° C. The breakthrough times of both regenerated sorbents increased as the regeneration temperature increased. Cu—ZnO/SiO$_2$ sorbents are more sensitive to regeneration temperature than ZnO/SiO$_2$ sorbents in a low temperature range. The recovery rate of ZnO/SiO$_2$ suggests that most of the sulfur capacity recovered was easily accessible. This recovered capacity was only a small part of the whole potential capacity, and was not sensitive to the regeneration temperature. In addition to this easily accessible capacity, Cu—ZnO/SiO$_2$ had extra sulfur capacity that could be accessed by diffusion. However, this extra capacity is more sensitive to temperature, likely due to diffusion. Comparison between ZnO/SiO$_2$ and Cu—ZnO/SiO$_2$ versus ZnO extrudates confirms that the high surface area is an important factor for the room temperature desulfurization performance. Doped Cu may also reduce the ZnO grain size and improve desulfurization performance.

6.(b) Multiple Cycle Tests on Cu—ZnO/SiO$_2$

Figure 14:
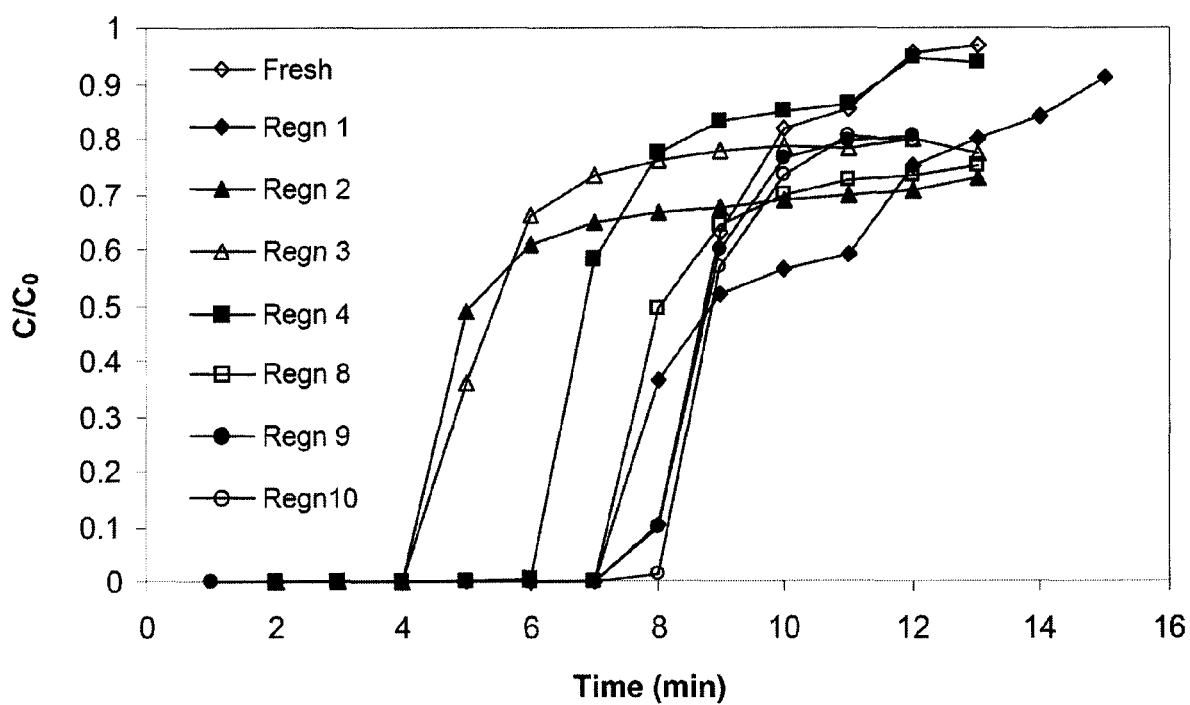
FIG. 14 illustrates the breakthrough curves of multiple adsorption/desulfurization cycle tests of CuZnO/$SiO_2$. Cu—ZnO/$SiO_2$ sorbent (1 g) was tested at room temperature with 2 vol % $H_2S$—$H_2$ at face velocity of 3 cm/s at room temperature.

The ZnO/SiO$_2$ sorbent is highly regenerable. Cu—ZnO/SiO$_2$ (1 g) was tested for H$_2$S removal and the breakthrough curves are shown in FIG. 14. The breakthrough curves of multiple adsorption/desulfurization cycles are shown in FIG. 10. All of the desulfurization tests were carried out at the same conditions. In these multiple cycle tests, regenerations (Regn) 2 and 3 were performed at 400° C. for 1 hour, and Regn 4 was performed at 400° C. for 3 hour. All spent sorbents in the other tests were performed at 550° C. for 1 hour. Breakthrough patterns of Cu—ZnO/SiO$_2$ after ten cycles and fresh Cu—ZnO/SiO$_2$ were similar, as shown in FIG. 10. Cu—ZnO/SiO$_2$ demonstrated high regenerability for multiple cycle applications, and the best regeneration condition is at 550° C. for 1 hour.

Figure 15:
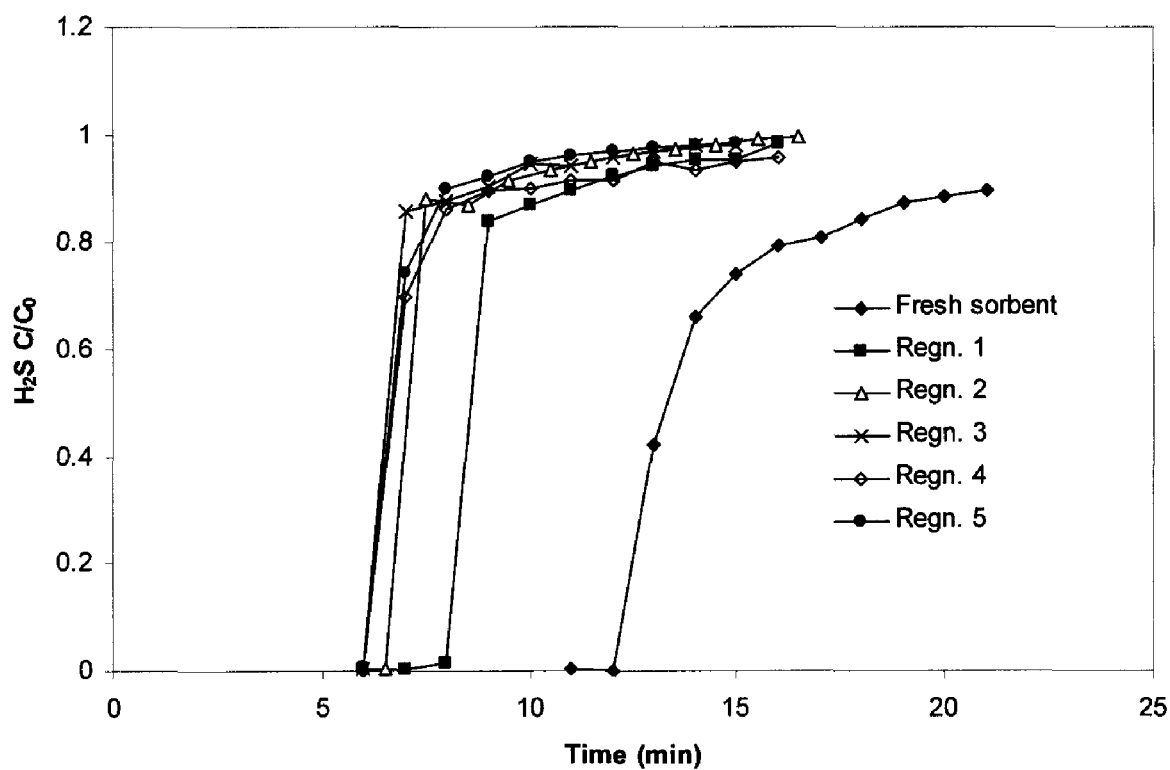
FIG. 15 illustrates the breakthrough curves of multiple adsorption/desulfurization cycle tests. Regeneration was performed at 300° C. for 1 hour. Cu—ZnO/$SiO_2$ sorbent (0.5 g) was tested at room temperature with 8000 ppmv $H_2S$—$H_2$ at face velocity of 2.3 cm/s at room temperature.

Cu—ZnO/SiO$_2$ sorbent can be regenerated at low temperatures. Further cyclic tests of Cu—ZnO/SiO$_2$ were carried out, in which the spent Cu—ZnO/SiO$_2$ was regenerated at 300° C. for 1 hour. Some degradation in the sorbent capacity was observed during the first few regeneration/adsorption cycles, and the breakthrough time (capacity) was finally stabilized around 6 minutes, which is 20% of theoretical saturation time under the test conditions, as shown in FIG. 15.

7. Aging Effect

Figure 16:
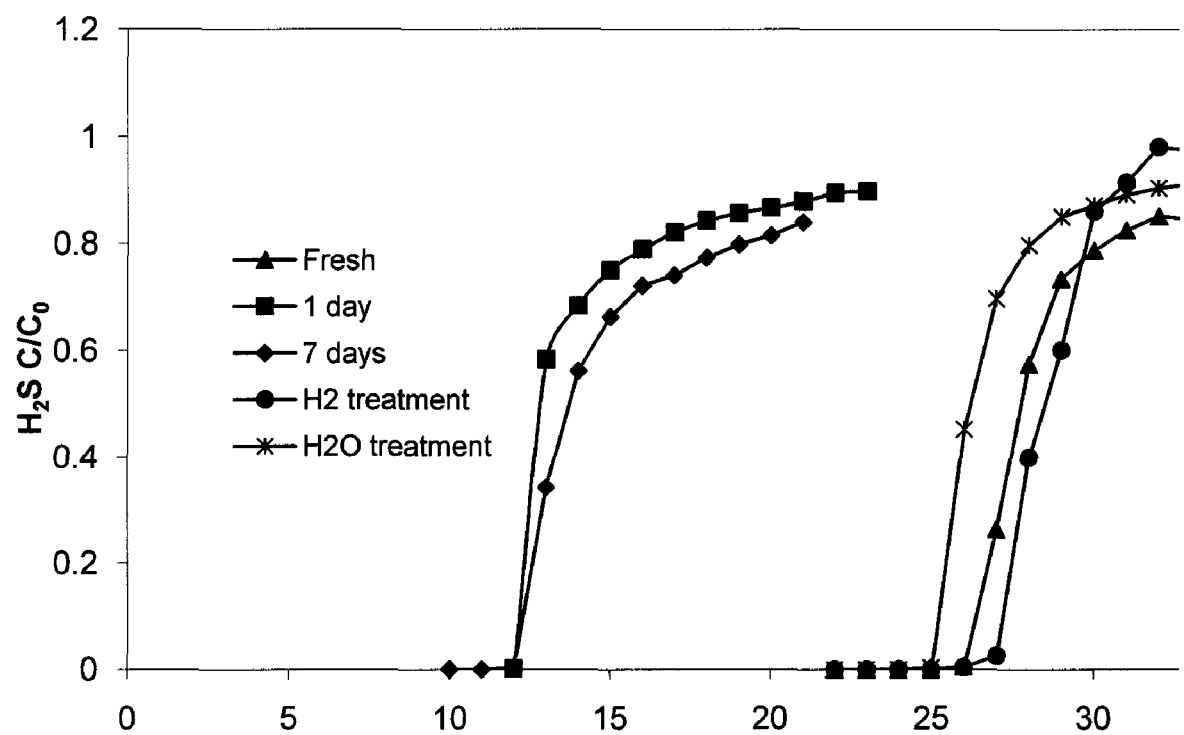
FIG. 16 illustrates the aging effect of Cu—ZnO sorbent. Cu—ZnO/$SiO_2$ sorbent (0.5 g) was tested at room temperature with 2 vol % $H_2S$—$H_2$ at face velocity of 2.3 cm/s.

The Cu—ZnO/SiO$_2$ sorbent composition was tested 1~3 days after calcination. The "fresh" sorbent (which here means the sorbent that had just cooled down to room temperature after sorbent preparation) demonstrated very high sulfur capacity and breakthrough time, as shown in FIG. 16. The Cu—ZnO utilization of this "fresh" sorbent was about 90% and the presence of H$_2$ slightly augmented the H$_2$S removal, while H$_2$O had a slight negative effects. However, this outstanding sulfur capacity was not stable, even when the sorbent particles were stored well in sealed bottles. This high capacity also was not regenerable. After regeneration, the sorbent behaves similarly to the aged sorbents discussed above. The same tests were performed after aging the sorbents for 1 day and 7 days, and the breakthrough curves are shown in FIG. 16.

8. Desulfurization at 200° C. in the Presence of CO or CO$_2$

Figure 17:
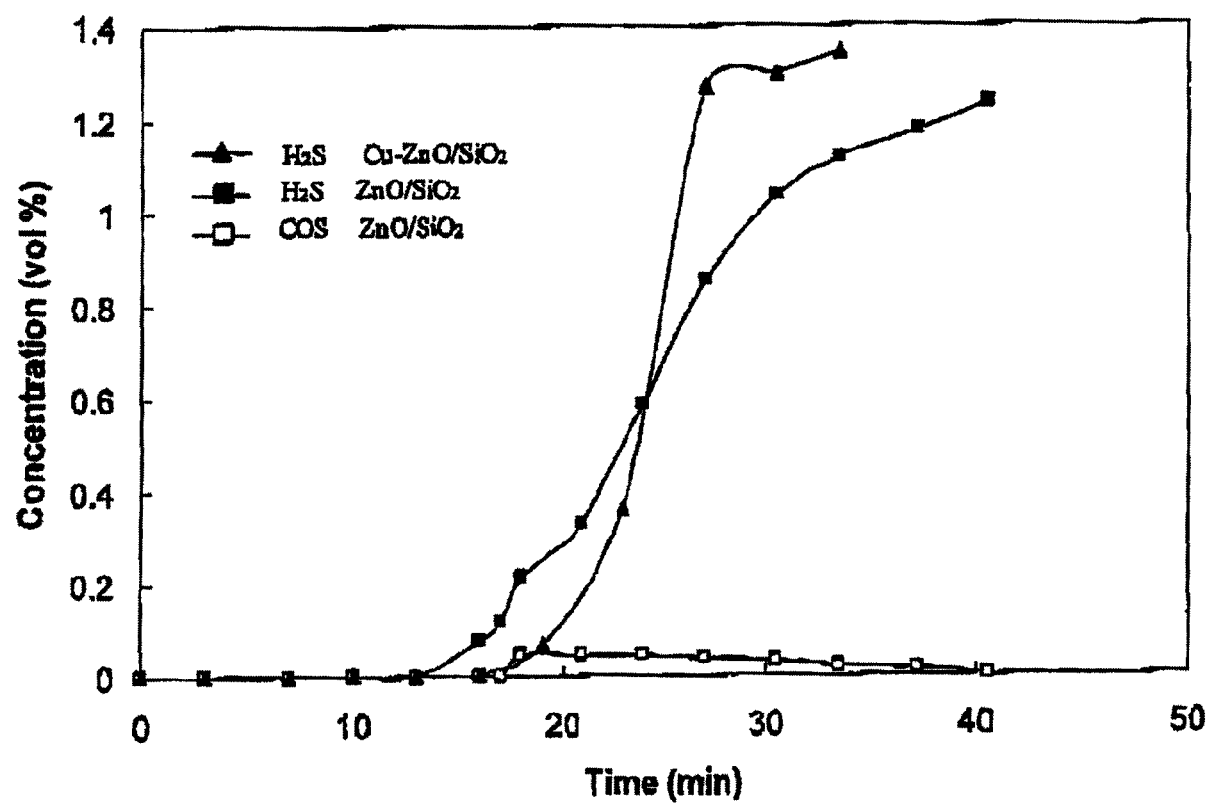
FIG. 17 provides the outlet concentration of COS and $H_2S$ in the test for ZnO/$SiO_2$ (1 g) and Cu—Zn/$SiO_2$ (1 g) at 200° C. Challenge gas was 1.4 vol. % $H_2S$-32 vol. % CO-66.6 vol. % $H_2$ at a face velocity of 4.6 cm/s.
Figure 18:
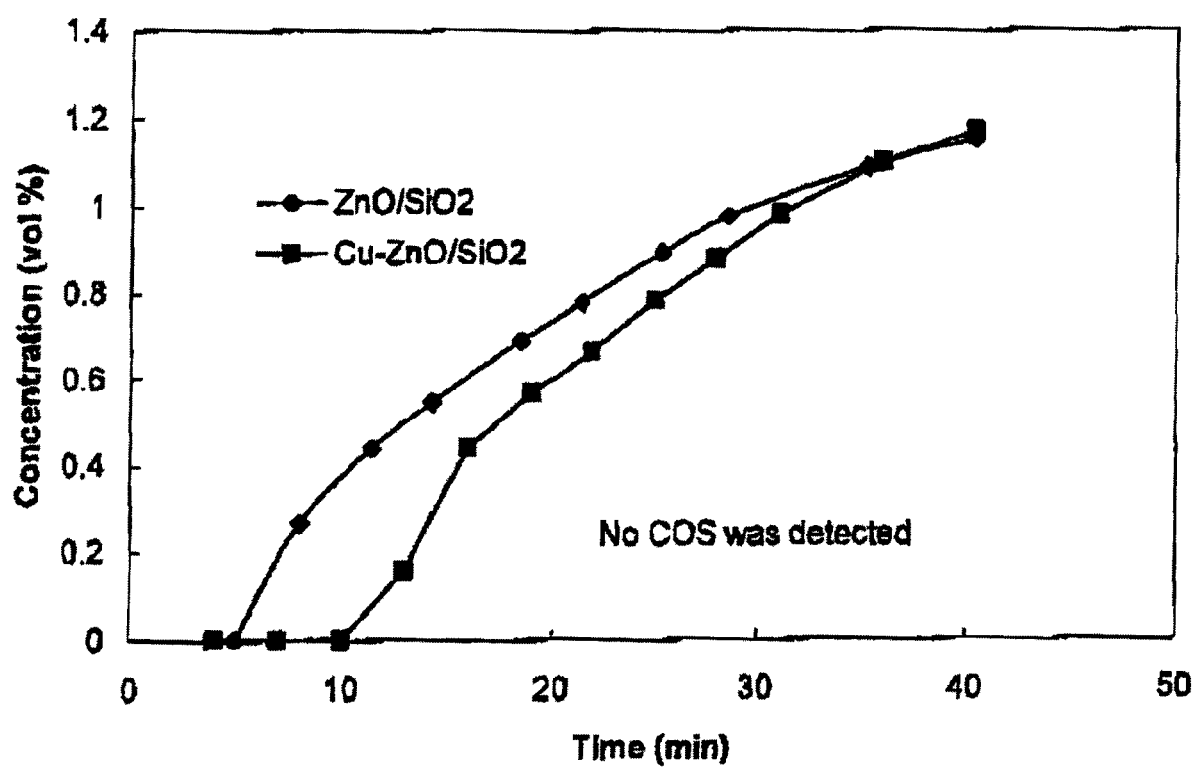
FIG. 18 provides the outlet concentration of COS and $H_2S$ in the test for ZnO/$SiO_2$ (1 g) and Cu—Zn/$SiO_2$ (1 g) at 200° C. Challenge gas was 1.4 vol. % $H_2S$-32 vol. % $CO_2$-66.6 vol. % $H_2$ at a face velocity of 4.6 cm/s.

A ZnO/SiO$_2$ sorbent and a Cu—Zn/SiO$_2$ sorbent were tested at 200° C. in the two challenge gases previously mentioned. The COS equilibrium concentration was calculated by using HSC Chemistry Software V3, and found to be 330 ppmv for CO—H$_2$S—H$_2$ and 970 ppmv for CO—H$_2$S—H$_2$. The test results are shown in FIGS. 17 and 18. In the desulfurization for CO—H$_2$S—H$_2$, COS was detected in the gas stream off the ZnO/SiO$_2$ sorbent. Its concentration decreased gradually to 0 after a maximum value of 270 ppmv. COS and H$_2$S were detected simultaneously. During the breakthrough test for Cu—Zn/SiO$_2$, no COS was detected. The breakthrough curve of Cu—Zn/SiO$_2$ sorbent is sharper than that of ZnO/SiO$_2$ sorbent, which confirms apparently faster reaction kinetics in Cu—Zn/SiO$_2$ sorbents.

In the experiments for CO$_2$—H$_2$S—H$_2$, no COS was detected for both ZnO/SiO$_2$ and Cu—ZnO/SiO$_2$. The reaction between CO and H$_2$S is an exothermic reaction, while the reaction between CO$_2$ and H$_2$S is endothermic. At low temperatures, CO is more active than CO$_2$ in the formation of COS. Carbon dioxide oppresses the reaction between H$_2$S and ZnO. Cu—ZnO/SiO$_2$ sorbents behaved as a highly effective sorbent ready to capture H$_2$S and COS, apparently due to the use of copper as promoter.

9. Desulfurization at 400° C. in the Presence of CO or CO$_2$

Figure 19:
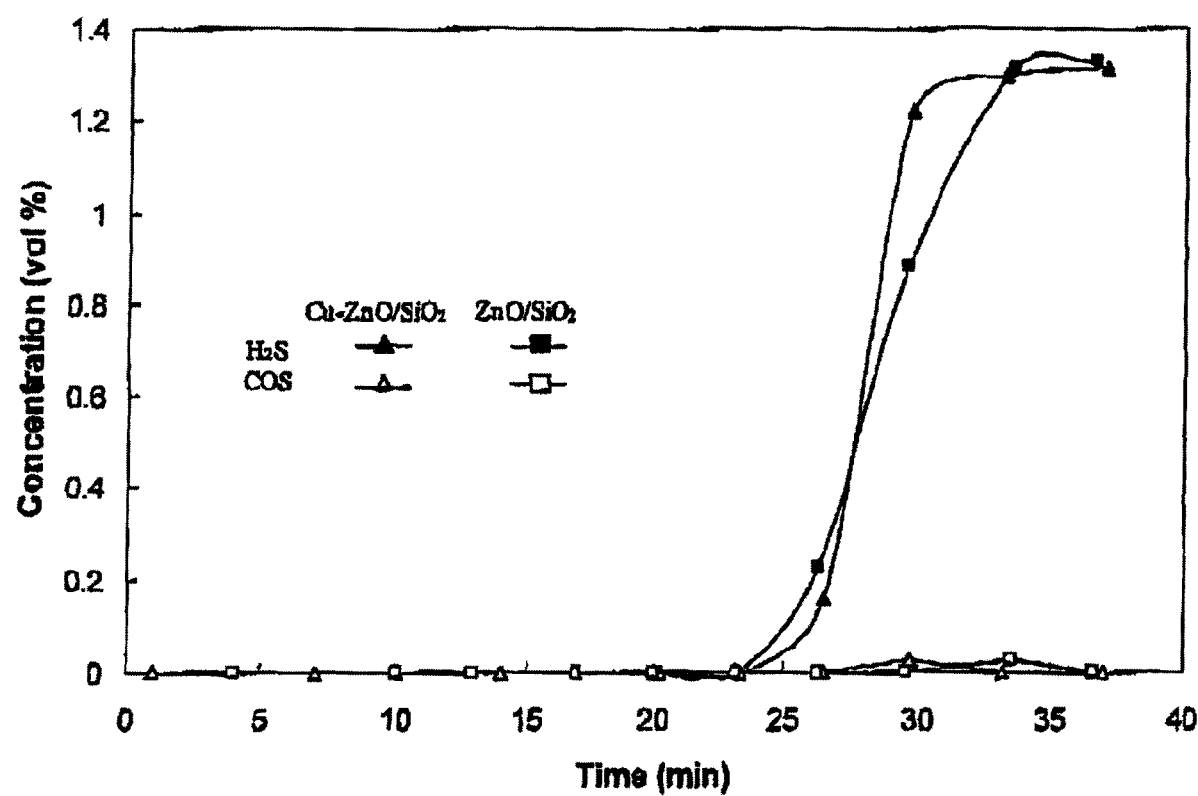
FIG. 19 provides the outlet concentration of COS and $H_2S$ in the test for ZnO/$SiO_2$ (1 g) and Cu—Zn/$SiO_2$ (1 g) at 400° C. Challenge gas was 1.4 vol. % $H_2S$-32 vol. % CO-66.6 vol. % $H_2$ at a face velocity of 6.62 cm/s.
Figure 20:
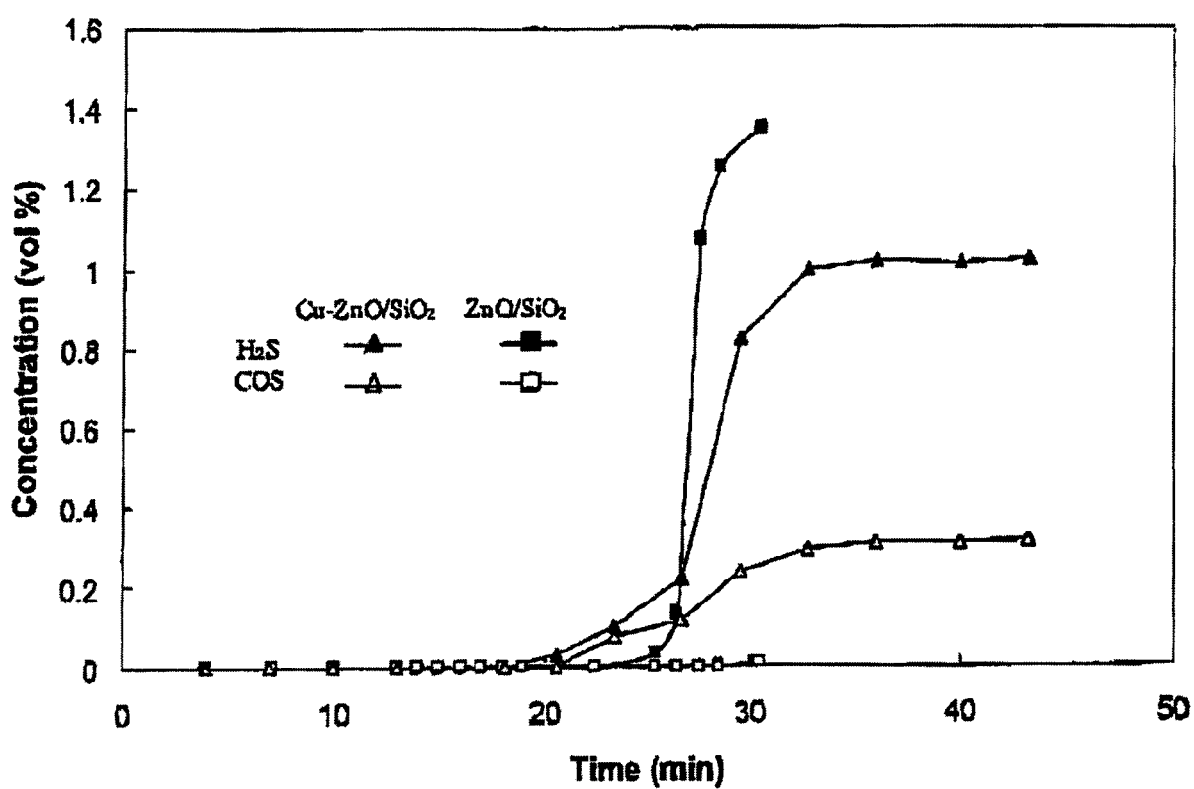
FIG. 20 provides the outlet concentration of COS and $H_2S$ in the test for ZnO/$SiO_2$ (1 g) and Cu—Zn/$SiO_2$ (1 g) at 400° C. Challenge gas was 1.4 vol. % $H_2S$-32 vol. % $CO_2$-66.6 vol. % $H_2$ at a face velocity of 6.62 cm/s.

Similar experiments were done at 400° C. for both sorbents. The test results are shown in FIGS. 19 and 20. The results for CO experiments are very similar to those tested at 200° C., except that the Cu—ZnO/SiO$_2$ sorbent demonstrated higher COS concentration and the breakthrough curve was not as sharp as that for ZnO/SiO$_2$. Moreover, CO$_2$ (<0.1 vol. % with decreasing concentration) was detected during the test on both sorbents. The CO$_2$ may be generated via the water gas shift reaction at 400° C. in the presence of water generated from the reaction between H$_2$S and Cu—ZnO. As Cu—ZnO was converted to Cu—ZnS, less water may have been generated, yielding lower CO$_2$ concentration.

Figure 21:
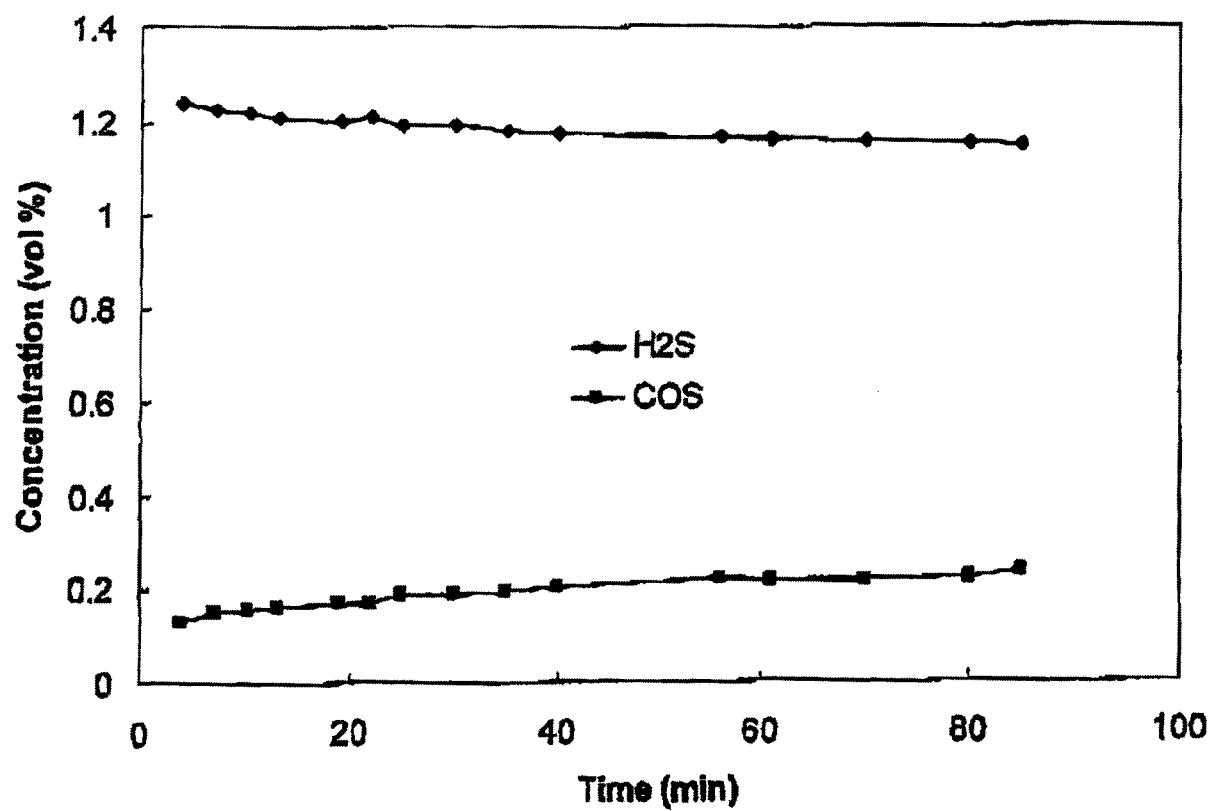
FIG. 21 provides the outlet concentration of COS and $H_2S$ in the test for spent ZnO/$SiO_2$ sorbent (1 g) at 400° C. Challenge gas was 1.4 vol. % $H_2S$-32 vol. % $CO_2$-66.6 vol. % $H_2$ at a face velocity of 6.62 cm/s.

The results are quite different in the experiments for CO$_2$—H$_2$S—H$_2$. The H$_2$S breakthrough and COS formation occurred much earlier in the Cu—ZnO/SiO$_2$ sorbents than in the ZnO/SiO$_2$ sorbent. The outlet concentration of H$_2$S and COS was steady around the equilibrium values of 1 vol. % and 0.31 vol. % for H$_2$S and COS, respectively (values were calculated by using HSC Chemistry Software V.3). The ZnO/SiO$_2$ sorbent demonstrated a very sharp breakthrough curve and generated trace amounts of COS, which concentration steadily increased throughout the test, as seen in FIG. 21. At moderate temperatures, the CO$_2$ becomes more active than CO in terms of COS formation and the reaction between CO$_2$ and H$_2$S is thermodynamically favorable, though it is a slow reaction. The copper doped ZnO behaves as a catalyst to accelerate the COS formation.

10. Microfibrous Entrapment

Figure 22:
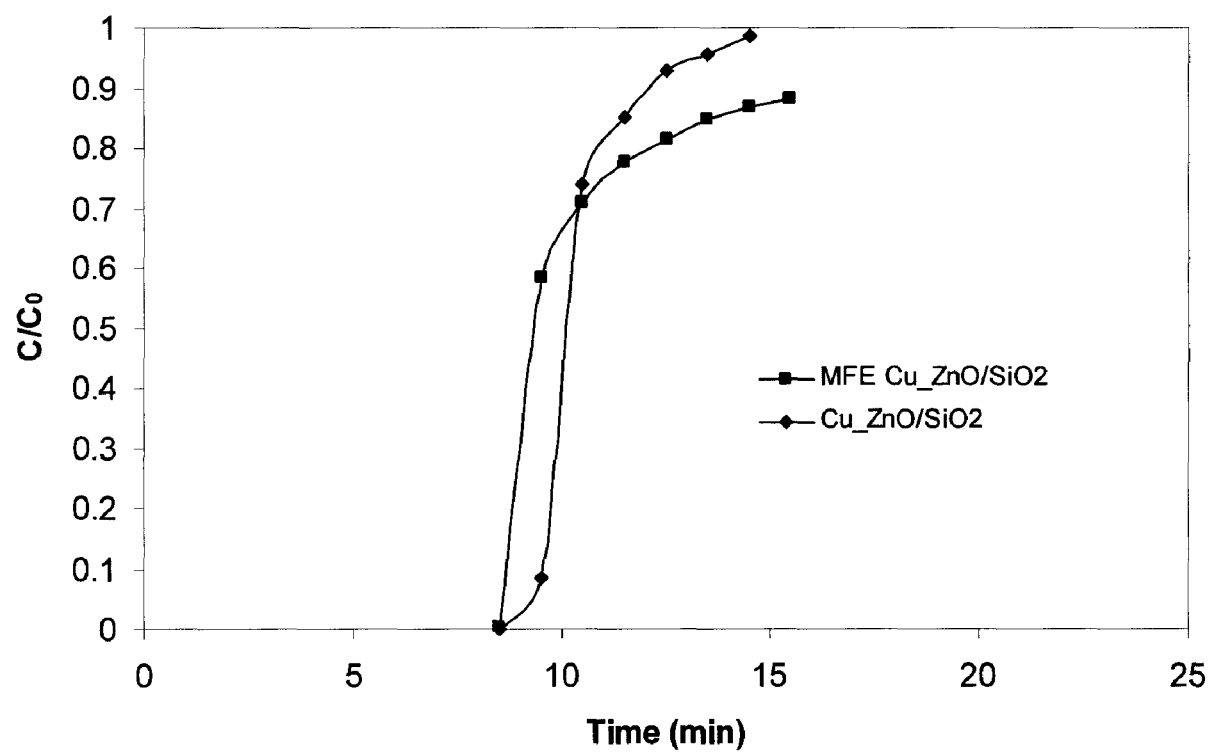
FIG. 22 provides a comparison between E-glass fiber (8 μm dia.) entrapped Cu—ZnO/$SiO_2$ and Cu—ZnO/$SiO_2$ tested at room temperature. In MFE, 0.466 g sorbent (containing 0.065 g Cu—ZnO) was loaded with ZnO loading at 14 wt %. In Cu—ZnO/$SiO_2$ packed bed, 0.38 g Cu—ZnO/$SiO_2$ was loaded at a ZnO loading of 17 wt %.

Microfibrous entrapped Cu—ZnO/SiO$_2$ was tested at room temperature. A Cu—ZnO/SiO$_2$ packed bed with the same amount of sorbent was also tested for comparison, as shown in FIG. 22. In the microfibrous entrapped sorbent test, three piece of E glass fiber (8 μm) entrapped Cu—ZnO/SiO$_2$ sorbent with a total weight of 0.466 g sorbent (containing 0.065 g Cu—ZnO, ZnO loading: 14 wt %) was loaded in a quartz tube reactor. In the Cu—ZnO/SiO$_2$ packed bed, 0.38 g Cu—ZnO/SiO$_2$ (containing 0.065 g of Cu—ZnO) has a ZnO loading of 17 wt %. In FIG. 22, there is no significant difference in breakthrough capacity or in the sharpness of the two breakthrough curves.

D. Summary

Copper doped ZnO/SiO$_2$ is a promising sorbent at low temperatures; it has high sulfur capacity and does not introduce COS formation in reformates containing CO and CO$_2$. At moderate temperatures, copper significantly accelerates the reaction between CO$_2$ and H$_2$S, the COS formation was equilibrium controlled. This sorbent require a lower regeneration temperature than ZnO/SiO$_2$ sorbent. Microfibrous entrapment makes the small sized Cu—ZnO/SiO$_2$ applicable in logistic fuel procession units with reduced reactor size. Therefore, Cu—ZnO/SiO$_2$ is a promising regenerable sorbent for low temperature applications, such as inline gas filters at stack temperature for fuel cells and protection filters during a fuel cell system startup. The mass transfer study suggests that the desulfurization process using Cu—ZnO/SiO$_2$ sorbents was controlled by grain diffusion. A further reduction in size ZnO grains on SiO$_2$ support may yield a better performance.

| Notation | | |
|---|---|---|
| $C_i$ | inlet H$_2$S concentration | ppmv |
| $C_o$ | outlet H$_2$S concentration | ppmv |
| $U_i$ | interstitial velocity | cm/s |
| $t_r$ | residence time | s |
| $k_a$ | apparent reaction rate | s$^{-1}$ |
| $k_e$ | mass transfer coefficient | cm/s |
| $K_i$ | $K_i = k_s S_a P \rho_b$ intrinsic reaction rate constant (reactor volume based) | s$^{-1}$ |
| $k_s$ | intrinsic reaction rate constant (surface area based) | cm/s |
| d | characteristic size | cm |
| $D_e$ | effective diffusivity | cm$^2$/s |

-continued

| | Greek letters | |
|---|---|---|
| α | external particle area per unit bed volume | $cm^2/cm^3$ |
| $\phi_1$ | Thiele modulus | |
| η | effectiveness factor | |

REFERENCES

[1] Slimane, R. B.; Abbasian, J. Regenerable Mixed Metal Oxide Sorbents for Coal Gas Desulfurization at Moderate Temperature, *Adv. Environ. Res.* 2000, 147-162.
[2] Baird, T.; Denny, P. J.; Hoyle, R.; McMonagle, F.; Stirling, D. Tweedy, J. Modified Zinc Oxide Absorbents for Low-Temperature Gas Desulfurization, *J. Chem. Soc. Faraday Trans.* 1992, 88, 3375-3382.
[3] Gasper-Galvin, L. D.; Atimatay, A. T.; Gupta, R. P. Zeolite-Supported Metal Oxide Sorbents for Hot Gas Desulfurization. *Ind Eng. Chem. Res.* 1998, 37, 4157-4166.
[4] Wang, Z.-M.; Lin, Y.-S. Sol-Gel Derived Alumina-Supported Copper Oxide Sorbent for Flue Gas Desulfurization, *Ind. Eng. Chem. Res.* 1998, 37, 4675-4681.
[5] Ko, T.-H.; Chu, H.; Chaung, L-. K. The Sorption of Hydrogen Sulfide from Hot Syngas by Metal Oxides over Supports, *Chemosphere,* 2005, 58, 467-474.
[6] Ben-Slimane, R.; Hepworth, M. T. Desulfurization of Hot Coal-Derived Fuel Gases with Manganese-Based Regenerable Sorbents. 1. Loading (Sulfidation) Test, *Energy & Fuels* 1994, 8, 1175-1183.
[7] Zhang, J.-C.; Wang, Y.-H.; Ma, R.-Y.; Wu, D.-Y. A study on Regeneration of Mn—Fe—Zn—O Supported upon $Al_2O_3$ Sorbents for Hot Gas Desulfurization, *Fuel Proc. Technol.* 2003, 84, 217-227.
[8] Flytani-Stephanopoulos, M.; Gavalas, G. R.; Tamhankar, S. S.; High temperature regenerative $H_2S$ sorbents, U.S. Pat. No. 4,729,889.
[9] Bakker, W. J. W.,; Kapteijin, F.; Moulijin, J. A. A High Capacity Manganese-Based Sorbent for Regenerative High Temperature Desulfurization with Direct Sulfur production: Conceptual Process Application to Coal Gas Cleaning, *Chem. Eng. J.,* 2003, 96, 223-235.
[10] Kyotani, T.; Kawashima, H.; Tomita, A. High_temperature Desulfurization Reaction with Cu-Containing Sorbents, *Environ. Sci. Technol.* 1989, 23, 218-223.
[11] Hernandez-Maldonado, A. J.; Yang, R. T.; Cannella, W., Desulfurization of Liquid Fuels by Adsorption via π Complexation with Cu(I)—Y and Ag—Y Zeolites, *Ind. Eng. Chem. Res.* 2003, 42, 123-129.
[12] Hernandez-Maldonado, A. J.; Yang, F. H.; Qi, G.; Yang, R. T., Desulfurization of transportation fuels by π-complexation sorbents: Cu(I)-, Ni(II)-, and Zn(II)-zeolites, *Appl. Catal. B: Environ,* 2005, 56, 111-126.
[13] Hernandez-Maldonado, A. J., Yang, R. T., Desulfurization of Commercial Jet Fuels by Adsorption via π-Complexation with Vapor Phase Ion Exchanged Cu(I)—Y Zeolites, *Ind. Eng. Chem. Res.* 2004, 43, 6142-6149.
[14] Atimatay, A. T.; Gasper-Galvin, L. D.; Poston, J. A. Novel Supported Sorbents for Hot Gas Desulfurization, *Environ. Sci. Technol.* 1993, 27, 1295-1303.
[15] Li, Z.-J.; Flyzani-Stephanopoulos, M. Cu—Cr—O and Cu—Ce—O Regenerable Oxide Sorbents for Hot Gas Desulfurization, *Ind. Eng. Chem. Res.* 1997, 36, 187-196.
[16] Goyette, W. J; Keenan; F. J., Method of removing hydrogen sulfide from hot gas mixtures, U.S. Pat. No. 5,700,439.
[17] Klabunde, K; Sanford, B. R.; Jeevanandam, P., Method of sorbing sulfur compounds using nanocrystalline mesoporous metal oxides, U.S. Patent Application No.: 20040260139.
[18] Ruettinger, W. F.; Farrauto, R. J.; Engelhard Corporation, Apparatus and process for improved hydrogen sulfide removal, U.S. Patent Application No.: 20020041842.
[19] Schubert; P. F., Sulfur absorbents, U.S. Pat. No. 5,177,050.
[20] Kamhankar, S. S.; Bagajewicz, M.; Gavalas, G. R.; Sharma, P. K.; Flytzani-Stephanophoulos, M. Mixed-Oxide Sorbents for High-Temperature Removal of Hydrogen Sulfide, *Ind. Eng. Chem. Process. Des. Dev.,* 1986, 25, 429-437.
[21] Gupta, R.; Gangwal, S. K.; Jain, S. C. Development of Zinc Ferrite Sorbents for Desulfurization of Hot Coal Gas in Fluid-Bed Reactor, *Energy & Fuels* 1992, 6, 21-27.
[22] Woods, M. C.; Gangwal, S. K.; Harrison, D. P.; Jothimurugesan, K. Kinetics of the Reactions of a Zinc Ferrite Sorbents in High-Temperature Coal Gas Desulfurization, *Ind. Eng. Chem. Res.* 1991, 30, 100-107.
[23] Grindley, T.; Steinfeld, G. Development and Testing of Regenerable Hot Coal-Gas Desulfurization Sorbents, DOE/MC/16545-1125, 1981.
[24] Gangwal, S. K.; Harkins, S. M.; Stogner, J. M.; Bossart, S. J. Testing of Novel Sorbents for $H_2S$ Removal from Coal Gas, *Environ. Prog.* 1989, 8, 26-32.
[25] Gupta, R.; Gangwal, S. K.; Jain, S. C. Development of Zinc Ferrite Sorbents for Desulfurization of Hot Coal Gas in a Fluid-Bed Reactor, *Energy & Fuels* 1992, 6, 21-27.
[26] Schubert; P. F., Sulfur absorbents, U.S. Pat. No. 5,077,261.
[27] Khare; Gyanesh P., Sorbent compositions, U.S. Pat. No. 5,710,089.
[28] Delzer, G. A.; Kidd, D. R.; Cogelled mixtures of hydrated zinc oxide and hydrated silica as sorbents for sulfur compounds. U.S. Pat. No. 5,130,288.
[29] Khare, Gyanesh P.; Engelbert, Donald R. Sorbent compositions. U.S. Pat. No. 6,350,422.
[30] Lew, S.; Jothimurugesan, K,; Flytzani-Stephanopoulos, M. High-Temperature $H_2S$ Removal from Fuel Gases by Regenerable Zinc Oxide-Titanium Dioxide Sorbents, *Ind. Eng. Chem. Res.* 1989, 535-541.
[31] Lew, S.; Jothimurugesan, K.; Flytzani-Stephanopoulos High-Temperature $H_2S$ Removal from Fuel Gases by Regenerable Zinc Oxide-Titanium Dioxide Sorbents, *Ind. Eng. Chem. Res.* 1989, 28, 535-541.
[32] Woods, M. C.; Gangwal, S. K.; Jothimurugesan, K.; Harrison, D. P. Reaction between $H_2S$ and Zinc Oxide-Titanium Oxide Sorbents. 1. Single-Pellet Kinetic Studies, *Ind. Eng. Chem. Res.* 1990, 29, 1160-1167.
[33] Lew, S.; Sarofim, A.; Flytzani-Stephanopoulos, Sulfidation of Zinc Titanate and Zinc Oxide Solids, *Ind. Eng. Chem. Res.* 1992, 31, 1890-1899.
[34] Harrison D. P.; Jothimurugesan, K. Reaction between $H_2S$ and Zinc Oxide-Titanium Oxide Sorbents. 2. Single Pellet Sulfidation Modeling, *Ind. Eng. Chem. Res.* 1990, 29, 1167-1172
[35] Farha, F. E.; Gardner, L. E. U.S. Pat. No. 4,313,820.
[36] Hatori, M.; Sasaoka, E.; Uddin, M. A. Role of $TiO_2$ on Oxidative Regeneration of Spent High-Temperature Desulfurization Sorbent $ZnO-TO_2$, *Ind. Eng. Chem. Res.,* 2001, 40, 1884-1890.
[37] Jothimurugesan, K.; Gangwal, S. K. Regeneration of Zinc Titanate $H_2S$ Sorbents, *Ind. Eng. Chem. Res.,* 1998, 37, 1929-1933.

[38] Sasaoka, E.; Sada, N.; Manabe, A.; Uddin, M. A.; Sakata, Y. Modification of ZnO—$TiO_2$ High-Temperature Desulfurization Sorbent by $ZrO_2$ Addition, *Ind. Eng. Chem. Res.*, 1999, 38, 958-963.

[39] Pineda, M.; Palacios, J. M.; Alonso, L.; Garcia, E.; Moliner, R., Performance of Zinc Oxide Based Sorbents, for Hot Coal Gas Desulfurization in Multicycle Tests in a Fixed-Bed Reactor, *Fuel*, 2000, 79, 885-895.

[40] Mojtahedi, M., HaS Removal From Coal Gas at Elevated Temperature and Pressure in Fluidized Bed with Zinc Titanate Sorbents. 2. Sorbent Durability. *Energy & Fuels* 1995, 9, 782-787.

[41] Jun. H. K.; Lee, T. J.; Kim, J. C A Study of Zn—Ti-Based $H_2S$ Removal Sorbents Promoted with Cobalt Oxides, *Ind. Eng. Chem. Res.*, 2002, 41, 3547-3556.

[42] Simanek, J.; Pick, P.; Havlicek, J., Hydrogen sulfide removal by zinc oxide, Sbornik Vysoke Skoly Chemicko-Technologicke v Praze, D: *Technologie Paliv*, 1976, D31, 437-483.

[43] Dantsig, G. A.; Grechenko, A. N.; Grigorev, V. V.; Serova, L. P.; Yagodkina, G. N., Effect of the method of copper oxide addition on chemisorption properties of zinc-containing sulfur-purification materials, *Zhurnal Prikladnoi Khimii* (Sankt-Peterburg, Russian Federation), 1988, 61, 1240-1246.

[44] Gangwal, S. K.; Harkins, S. M.; Stogner, J. M.; Woods, M. C.; Rogers, T. N., Bench-scale testing of novel high-temperature desulfurization sorbents: final report, Report, 1988, DOE/MC/23126-2662; Order No. DE89000935.

[45] Chen, J.; Brown, L. D.; Baird, W. C. J.; McVicker, G. B.; Ellis, E. S.; Touvelle, M. S.; Klein, D. P.; Vaughan, D. E. W., Regeneration of hydrogen sulfide sorbents, PCT Int. Appl. No.: WO 2002/008160.

[46] Xue, M.; Chitrakar, R.; Sakane, K.; Ooi, K., Screening of adsorbents for removal of $H_2S$ at room temperature, *Green Chem.* 2003, 5, 529-534.

[47] Davidson, J. M.; Lawrie, C. H.; Sohail, K. Kinetics of the Absorption of Hydrogen Sulfide by High Purity and Doped High Surface Area Zinc Oxide, *Ind. Eng. Chem. Res.* 1995, 34, 2981-2989.

[48] Sughrue, E. L.; Johnson, M. M.; Dodwell, G. W.; Reed, L. E.; Bares, J. E.; Gislason, Jason J.;); Morton, Robert W.; United States Published Application No.: 2004-0140244.

[49] Gupta; R. P.; Gangwal; S. K.; Jain; S. C., U.S. Pat. No. 5,254,516.

[50] Babich, I. V.; Moulijn, J. A., Science and technology of novel processes for deep desulfurization of oil refinery streams: a review, *Fuel* 2003, 82, 607-631.

[51] Barsoum, M. W., Fundamentals of Ceramics (Series in Materials Science and Engineering), 1st Ed. Taylor & Francis, 2002.

[52] Borchert, H.; Zhang, Z. L.; Baerns, M. The effect of oxygen ion conductivity of catalysts for their performance in the oxidative coupling of methane. Preprints-American Chemical Society, Division of Petroleum Chemistry, 1992, 37, 111-16.

[53] Cheng, W. H.; Kung, H. H., Chemical properties of anion vacancies on zinc oxide, *Surface Science*, 1981, 102, L21-L28.

[54] Lu Y., Sathitsuksanoh, N., Yang, H. Y., Chang, B. K., Queen, A. P., Tatarchuk, B. J., Microfibrous Entrapped ZnO-Supported Sorbent for High Contacting Efficiency $H_2S$ Removal from Reformate Streams in PEMFC Applications, in: Edit by Wang, Y. & Holladay, J. D. (Eds), ACS Symposium Series, 2005, vol. 914. Microreactor Technology and Process Intensification, Washington D.C., p. 406-422.

All publications and patent applications cited in this specification are herein incorporated by reference as if each individual publication or patent application were specifically and individually indicated to be incorporated by reference.

We claim:

1. A sorbent composition comprising a porous silicon dioxide particles having a pore volume of about 0.1-3.0 cc/g impregnated with a mixture comprising zinc oxide and copper material, wherein the mixture comprises about 80-99% zinc oxide (w/w) and about 1-20% copper material (w/w), the impregnated particles comprise about 5-40% of the mixture (w/w), and copper and zinc are present in the mixture at a doping ratio $Cu_xZn_{(1-x)}O/SiO_2$ wherein $0.05 \leq x \leq 0.3$.

2. The sorbent composition of claim 1, wherein the copper material is selected from a group consisting of copper metal, copper oxide, and combinations thereof.

3. The sorbent composition of claim 1, wherein the silicon dioxide particles comprise MCM silicon dioxide.

4. The sorbent composition of claim 1, wherein the particles have a surface area of about 100-1000 $m^2/g$.

5. The sorbent composition of claim 1, wherein the particles have an average diameter of about 30-6000 microns.

6. The sorbent composition of claim 1, wherein the particles have an average diameter of about 30-300 microns.

7. The sorbent composition of claim 1, wherein the particles have an average pore diameter of about 0.2-70 nm.

8. A filter material comprising the sorbent composition of claim 1 entrapped in a matrix of fibers.

9. The filter material of claim 8, wherein the fibers have an average diameter of about 2-20 microns and the particles have an average diameter of about 30-300 microns.

10. The filter material of claim 8, wherein the sorbent composition is bonded to the matrix of fibers.

11. The filter material of claim 10, wherein the sorbent composition is bonded to the matrix of fibers by performing a sintering process.

12. The filter material of claim 10, wherein the fibers have an average diameter of about 2-20 microns and the particles have an average diameter of about 30-300 microns.

13. The filter material of claim 10, wherein the fibers are ceramic fibers.

14. A method for preparing the sorbent composition of claim 1, the method comprising:
impregnating porous particles with a solution comprising dissolved zinc salt and dissolved copper salt, wherein the volume of the solution is no more than the pore volume of the porous particles;
drying and calcining the impregnated particles.

15. The method of claim 14, wherein step (b) comprises heating the impregnated particles to a temperature of about 20-400° C. for at least about 2 hours.

16. The method of claim 14, wherein the zinc salt is selected from a group consisting of zinc nitrate, zinc acetate, and a mixture thereof; and the copper salt is selected from a group consisting of copper nitrate, copper acetate, and a mixture thereof.

17. The method of claim 14, wherein the step of impregnating is performed by incipient wetness impregnating, spray impregnating, or a combination of both.

18. The method of claim 14, wherein the step of drying is performed by a step selected from a group consisting of:
drying at a temperature range of about 20-200° C.;
drying in sub-atmospheric pressures of about 0.001-759 torr;
drying in the presence of flowing gas stream; and
a combination thereof.

19. The method of claim 18, wherein the flowing gas stream comprises a gas selected a group consisting of air, nitrogen, oxygen, argon, helium, and a combination thereof.

20. The method of claim 18, wherein calcining is performed by heating the dried particles to a temperature in a range of about 100-800° C. for at least about 1 hour and contacting the dried particles with a flowing gas stream.

21. A process for removing sulfur compounds from a stream, the process comprising passing the stream through an effective amount of the sorbent composition of claim 1 for a sufficient period of time to reduce sulfur compounds in the stream to a level of no more than about 1 ppmw.

22. The process of claim 21, wherein the sorbent composition is contained within a cartridge having a top and a bottom and the stream passes from the top of the cartridge to the bottom of the cartridge.

23. The process of claim 21, further comprising removing sulfur compounds adsorbed to or retained by the sorbent composition.

24. The process of claim 23, wherein the step of removing sulfur compounds adsorbed to or retained by the sorbent composition is performed by heating the sorbent composition to a temperature between about 100-900° C. and passing an oxidizing agent over the sorbent composition.

25. The process of claim 24, wherein the oxidizing agent is selected from a group consisting of air, pure oxygen, ozone, hydrogen peroxide, and a combination thereof.

26. A filtering system comprising:
a first sorbent composition according to claim 1, wherein the first sorbent composition preferentially adsorbs a first sulfur compound; and
a second sorbent composition according to claim 1, wherein the second sorbent composition preferentially adsorbs a second sulfur compound.

27. The filtering system of claim 26 contained in a cartridge.

28. A fuel filter assembly comprising the filtering system of claim 26.

* * * * *